US008234408B2

(12) United States Patent
Jungck

(10) Patent No.: US 8,234,408 B2
(45) Date of Patent: Jul. 31, 2012

(54) DIFFERENTIATING UNIQUE SYSTEMS SHARING A COMMON ADDRESS

(75) Inventor: Peder J. Jungck, San Carlos, CA (US)

(73) Assignee: CloudShield Technologies, Inc., Sunnyvale, CA (US)

(*) Notice: Subject to any disclaimer, the term of this patent is extended or adjusted under 35 U.S.C. 154(b) by 352 days.

(21) Appl. No.: 12/557,013

(22) Filed: Sep. 10, 2009

(65) Prior Publication Data

US 2011/0060845 A1    Mar. 10, 2011

(51) Int. Cl.
*G06F 15/16* (2006.01)
(52) U.S. Cl. ........ 709/245; 709/218; 709/219; 709/224; 709/225
(58) Field of Classification Search .............. 709/245, 709/218–219, 224–225
See application file for complete search history.

(56) References Cited

U.S. PATENT DOCUMENTS

| 6,587,873 B1* | 7/2003 | Nobakht et al. ............ 709/219 |
| 2007/0180100 A1* | 8/2007 | Biggs et al. ................ 709/224 |
| 2010/0188992 A1* | 7/2010 | Raleigh ...................... 370/252 |
| 2010/0217837 A1* | 8/2010 | Ansari et al. ............... 709/218 |

OTHER PUBLICATIONS

Web Bug, Wikipedia, Jul. 2007, 4 pgs.
Understanding User-Agent Strings, at least as early as May 17, 2006, 4 pgs.
Operations Support Systems, Wikipedia, Aug. 16, 2007, 4 pgs.
Regular Expression, Wikipedia, Aug. 20, 2007, 11 pgs.
HS-100/HS-100W Parental Control Gateway, User's Guide, Version 3.62, ZyXel, Oct. 2005, 356 pgs.

\* cited by examiner

*Primary Examiner* — Wing Chan
*Assistant Examiner* — Benjamin M Thieu
(74) *Attorney, Agent, or Firm* — Lempia Summerfield Katz LLC

(57) ABSTRACT

A system for differentiating unique systems and/or users sharing a common address may include an interface, a device identifier, a communication interceptor and a communication processor. The interface may be operative to receive a designation of a plurality of devices and/or users and a specification of corresponding services to be provisioned. The device identifier may be operative to cause the devices to provide a unique identifier with each communication originated by the device and store the unique identifier and the associated specification in a memory. The communication interceptor may be operative to intercept a communication originated by one of the devices and determine the unique identifier associated with the communication. The communication processor may be operative to determine the associated device and/or user specific service to be provisioned based on the unique identifier and process the communication in accordance with the associated device and/or user specific service to be provisioned.

26 Claims, 16 Drawing Sheets

CloudShield Web Management Interface

| General | Hardware | Network | Software | Security | Configuration | Logout |
|---|---|---|---|---|---|---|

Logs

[Refresh] [Clear All] [Clear Selected]

Sort by Stage    Sort by Table

Table Name: SYS_DEFINED

| | StageId | Var Name | # Element | View | Value |
|---|---|---|---|---|---|
| ☐ | Outbound Stage 2 | UserMon_DHCP_ACKResponse | 1 | ○hex ●dec ○native ○ip | 6 |
| ☐ | Outbound Stage 2 | UserMon_DHCP_LastIP | 1 | ○hex ○dec ○native ●ip | 10.10.2.190 |
| ☐ | Outbound Stage 2 | UserMon_DHCP_OtherResponse | 1 | ○hex ●dec ○native ○ip | 16 |
| ☐ | Outbound Stage 2 | UserMon_DHCP_Reference | 40000 | | view detail |
| ☐ | Outbound Stage 2 | UserMon_DHCP_RefreshEqual | 1 | ○hex ●dec ○native ○ip | 1 |
| ☐ | Outbound Stage 2 | UserMon_DHCP_TotalRecords | 1 | ○hex ●dec ○native ○ip | 4 |
| ☐ | Outbound Stage 2 | UserMon_DHCP_UpdateIPAddress | 1 | ○hex ●dec ○native ○ip | 1 |
| ☐ | Outbound Stage 2 | UserMon_DHCP_UserLimitFailure | 1 | ○hex ●dec ○native ○ip | 0 |

[Refresh] [Clear All] [Clear Selected]

(As of Nov 16, 2004 2:36:14 PM, Updating every 5 minutes.)

FIG. 13

|  | Children | Teens | College |
|---|---|---|---|
| Abortion | X | X |  |
| Alcohol/Tobacco | X | X | X |
| Chat/Instant Messaging | X |  |  |
| Cult/Occult | X | X | X |
| Email | X |  |  |
| Gambling | X | X | X |
| Gay/Lesbian | X | X |  |
| Hacking/Proxy Avoidance | X | X | X |
| Illegal Drugs | X | X | X |
| Illegal/Questionable | X | X | X |
| Intimate Apparel/Swimsuit | X |  |  |
| Military | X | X |  |
| News/Media | X |  |  |
| Newsgroups | X |  |  |
| Nudity | X | X | X |
| Pay to Surf | X | X | X |
| Personals/Dating | X | X |  |
| Political/Activist Groups | X | X |  |
| Pornography | X | X | X |
| Religion | X |  |  |
| Search Engines/Portals | X |  |  |
| Sex Education | X | X | X |
| Streaming Media/MP3 | X |  |  |
| Violence/Hate/Racism | X | X | X |
| Weapons | X | X |  |

FIG. 14

```
<RATINGS>
    <DOMAIN>
        <NAME>yahoo.com</NAME>
        <FREQUENCY>Common</FREQUENCY>
        <REGION>US</REGION>
        <CATEGORY>Search Engines/Portals</CATEGORY>
    </DOMAIN>
    <DOMAIN>
        <NAME>cnn.com</NAME>
        <FREQUENCY>Common</FREQUENCY>
        <REGION>US</REGION>
        <CATEGORY>News/Media</CATEGORY>
    </DOMAIN>
</RATINGS>
```

FIG. 15

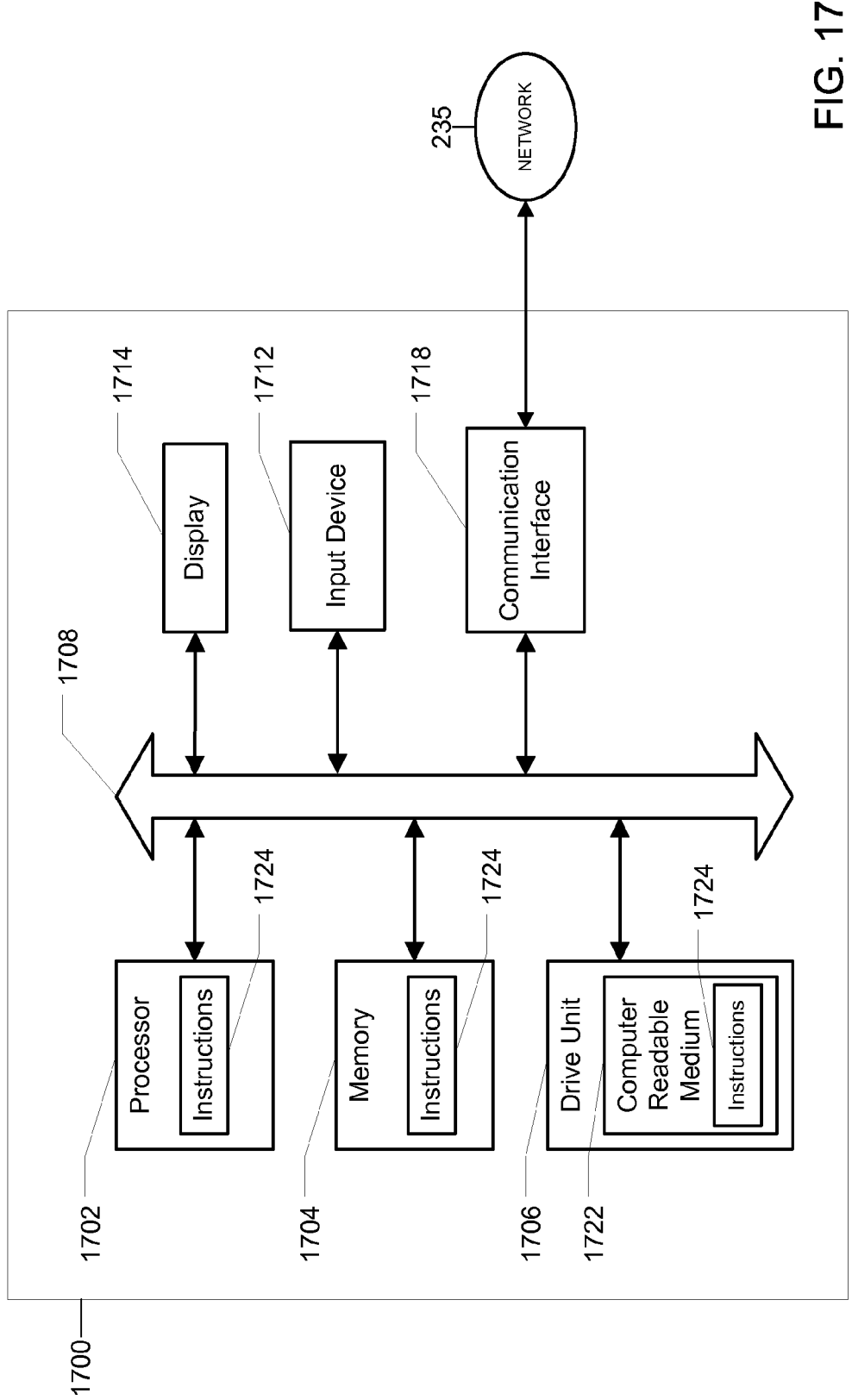

DIFFERENTIATING UNIQUE SYSTEMS SHARING A COMMON ADDRESS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present description relates generally to a system and method, generally referred to as a system, for differentiating unique systems sharing a common address, and more particularly, but not exclusively, to differentiating unique systems sharing a common address to provision differentiated services based thereon.

BACKGROUND

The proliferation of high speed cellular data networks, and other alternative forms of providing internet service, such as via satellite, may be increasing competition in the internet service provider market. In order to retain current users and attract new users, and/or derive additional revenue therefrom, service providers may be looking to offer additional hosted services. Since users often use a router to share internet service amongst several devices on their local, e.g. home or office, networks, the hosted services may be more valuable if the services can be individually provisioned, and configured, for each device on the users' local networks.

For example, users may be attracted to a hosted content control service for which individual content control policies may be implemented for each device on the user's network. Current service provider hosted services may be unable to distinguish between multiple devices on a user's network when the user utilizes a router with Network Address Translation ("NAT"). A router utilizing NAT may cause all communications originating from the user's network to appear to have originated from the same device. Thus, service providers may be unable to individually provision hosted services to these users individually or otherwise provide differentiated services. Since the service providers are unable to individually provision the services they are further unable to individually configure the services for each user. Thus, the services must be implemented to all of the users and/or devices and the services must be configured uniformly across all of the users and/or devices.

For example, in the case of a content control service, parents may wish to prevent their children from being exposed to inappropriate content on the Internet while reserving their own ability to view such content. There may be a device level content control solution, such as content control software, that parents may install on their children's internet accessible devices. The content control software may prevent the children from accessing inappropriate content through the device. However, some children may be able to circumvent a device level content control solution, and thereby access inappropriate content. In addition, parents may be responsible for maintaining a device level solution and ensuring the software is regularly updated. A content control solution implemented at a service provider level, while still offering content control on a per device basis, may be immune to the tampering of children and may remove the maintenance burden from parents. However, a service provider level content control solution offering device level control may be unappealing to parents using a home router implementing NAT, who, for example, wish to access such services but prevent access by their children, because the service provider may be unable to determine the device originating a given communication and, therefore, all devices on the network would be blocked from accessing such content.

SUMMARY

A system for differentiating unique systems sharing a common address may include an interface, a device identifier, a communication interceptor and a communication processor. The interface may be operative to receive a designation of each device of the plurality of devices and a specification of a corresponding device specific service to be provisioned. The device identifier may be coupled with the interface and may be operative to cause each of the plurality of devices to provide a unique identifier with each communication originated by the device. The unique identifier may uniquely identify each device from at least the other devices of the plurality of devices independent of the common address. The device identifier may also be operative to store the unique identifier and the associated specification of the device specific service to be provisioned in a memory. The communication interceptor may be operative to intercept a communication originated by one of the plurality of devices and determine the unique identifier provided with the communication. The communication may not otherwise uniquely identify the device originating the communication from the other devices of the plurality of devices. The communication processor may be coupled with the memory and the communication interceptor and may be operative to determine the device specific service to be provisioned associated with the device based on at least the unique identifier and process the communication in accordance with the device specific service to be provisioned associated with the device.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 13 is a screenshot of an interface for monitoring changes to the IP addresses of devices in the systems of FIG. 1 and FIG. 2, or other systems for differentiating unique systems sharing a common address.

FIG. 14 is an illustration of a table showing exemplary categories for a content control service that may be provisioned to users in the systems of FIG. 1 and FIG. 2, or other systems for differentiating unique systems sharing a common address.

FIG. 15 is an exemplary extensible markup language ("XML") representation of the ratings of domains in a content control service implemented by the systems of FIG. 1 and FIG. 2, or other systems for differentiating unique systems sharing a common address.

FIG. 17 is an illustration of a general computer system that may be used in the systems of FIG. 2, FIG. 3, and FIG. 4, or other systems for differentiating unique systems sharing a common address.

DETAILED DESCRIPTION

Figure 1:
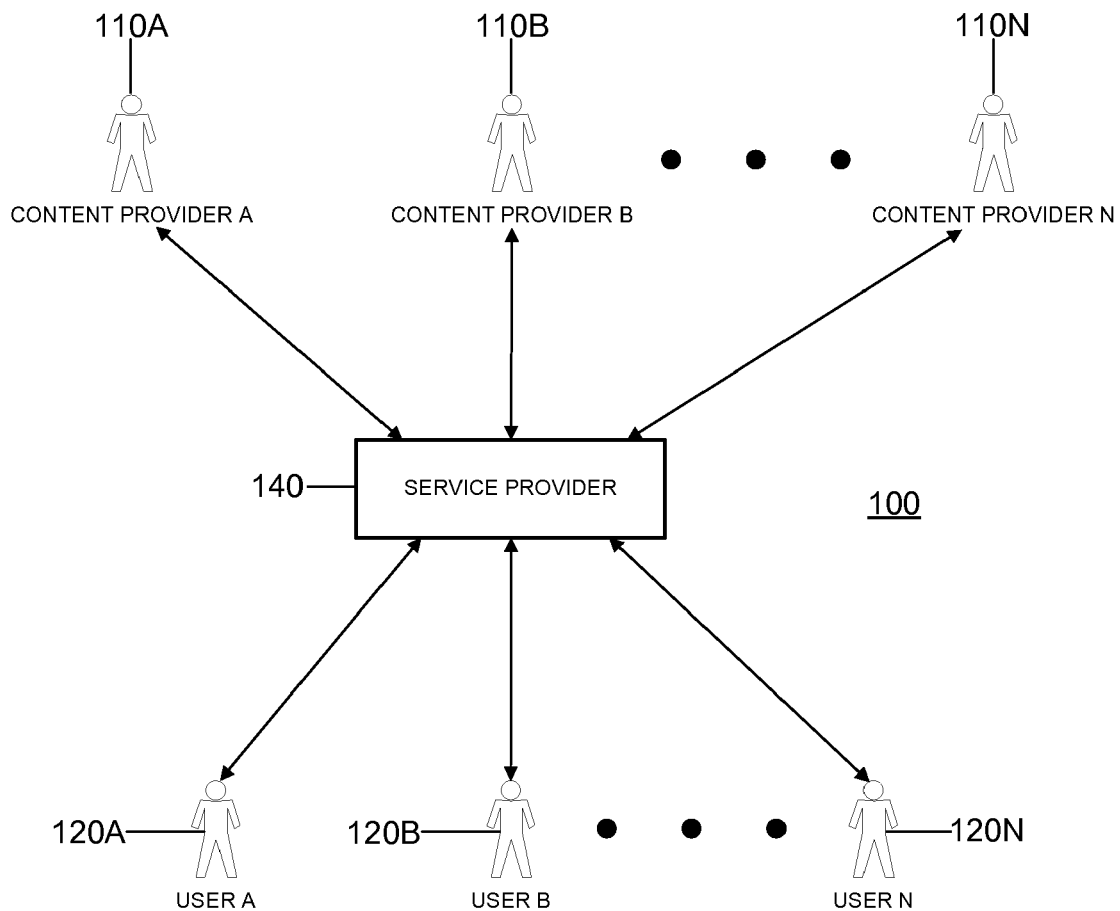
FIG. 1 is a block diagram of a general overview of a system for differentiating unique systems sharing a common address.

The disclosed embodiments relate to differentiating unique systems sharing a common address, and more particularly, but not exclusively, to differentiating unique systems sharing a common address to provide hosted services individually configurable for each unique system or each unique user/login, such as a content control service. For illustrative purposes the principles described herein may be referenced in the specific embodiment of a content control service, however the principles may be embodied in many different forms, e.g. the provision of different services such as antivirus, anti-spyware or other malicious software protection service, denial of service protection, spam filtering, logging or recording services, subscription based content provisioning service, broad-band network access control or generally any service or level of service, or combination thereof, deliverable or provided via a network. In one embodiment, the functionality described herein is implemented using a CLOUDSHIELD CS-2000 manufactured by CloudShield Technologies, Inc., located in San Jose, Calif.

The hosted services provisioning system may allow a service provider to provision, and configure carrier-class hosted services to users. The hosted services may be individually provisioned and configured for each device and/or login on the users' networks, such as by storing a specification describing a device, or user specific service to be provisioned. The system may associate a unique identifier with each device and/or login on the users' network, such as by adding a unique identifier to the user agent string associated with the device and/or user login, so as to cause the device, either regardless of user or to which the associated user is logged in, depending on the implementation, to provide the unique device/user identifier with each communication originated therefrom. The unique identifier may be independent of the IP address, thereby overcoming any limitations imposed by Network Address Translation ("NAT") and/or by sharing multiple logins on the same device.

It will be appreciated that a given device may be assigned a unique identifier unique to the device regardless of what user may be logged in, or the unique identifier of the device may vary depending on the user that is logged in so as to uniquely identify the user of the device. The unique identification of the user may not be unique to the device, thereby permitting unique identification of the user regardless of which device they are logged in. Further, a unique identifier of both the user and the device to which they are logged in may be used so as to uniquely identify both the user and the device. By associating unique identifiers with user logins, services may be provisioned uniquely by user regardless of the device they may be using. By further using device unique identifiers, services may be further provisioned uniquely based on the device the user is using, e.g. wired vs. wireless devices, secure vs. non-secure devices, etc.

As used herein, a unique identifier refers to either an identifier, provided by a device, which uniquely identifies the device, the user or both. This identifier may be encrypted or unencrypted. The unique identifier may be unique only within the local network represented by the common network address. Accordingly, a device of one network having a particular unique identifier may be differentiated based on the network address from a device of another network having the same unique identifier. Alternatively, wholly unique identifiers may be used for all devices.

The user or administrator may be able associate a specification describing a device and/or user specific service with each device and/or user and the specification may then be associated with the unique device/user identifier. The specification may also include one or more configuration parameters specific to the device/user and the service to be provisioned. Each time a device communicates external to its local network, such as making a request for data, the identifier may be used to retrieve the specification associated with the device and/or user, and handle the communication according to the specification. If the communication does not contain a unique device and/or user identifier the system may, in one embodiment, block the communication. Alternatively, the device may be redirected to a service which to have a unique identifier assigned to the device or user login, subject to, for example, authentication or approval of the user, host or other administrator.

For example, the hosted services provisioning system may provide for a carrier-class implementation of a content control service, such as a parental content control service. The service may be a real-time, scalable content control service for service provider networks. A service provider, such as an internet service provider, may utilize the system to provide a device-level content control service to its users. The system may include a web interface that users may use to provide a designation of each device, and/or user thereof, and a specification identifying the content control service to be provisioned. The specification may also include one or more configuration parameters relevant to the content control service. The system may cause each device to provide a unique identifier with each communication from the device, such as by adding a token to the user agent string, described in more detail below, of each device. The unique identifier may uniquely identify each device, and/or user thereof, from the other devices on the network, and/or the other users of the device, and may be associated with the specification. The service provider may then intercept communications from users of the network, determine, based on the unique identifier, the device or user specific service to be provisioned associated with the device originating each communication, and handle each communication based on the corresponding specification. Interception of communications may include temporarily or permanently buffering or otherwise holding on to communications, e.g. requests, directed, e.g. addressed, to one or more intended recipients, e.g. content or service providers, prior to receipt thereby. Handling the communication may include blocking/deleting the communication, blocking the response to the communication, allowing the communication to continue to a specified intended destination, with or without the unique identifier included therein, further allowing the response thereto to be provided back to the originating device, or modifying the communication, such as by modifying the destination or content of the communication or response thereto, or combinations thereof.

A content control service may allow a user, such as a parent, to control the content accessible by users of their network, such as children. The service may be implemented at the service provider level, such as hosted by the service provider, and therefore may be less likely to be circumvented by the users of the network. The system may prevent users, such as children, from accessing inappropriate items, such as web content, voice over internet protocol ("VoIP") content, internet protocol television ("IPTV") content, streaming multimedia content, or generally any content that may be transmitted through a network. A parent may be able to control the content that is accessible on each device on their network, or each login on each device, by specifying the content control service for each device and/or login. The specification may include one or more configuration parameters for each device and/or login, such as a content control policy which specifies permissible and/or impermissible content. The system may associate an identifier with each device and/or login, such as by adding a device or login-unique identifier to the user agent string associated with the device/login. The identifier may be independent of the IP address, thereby overcoming any limitations imposed by NAT and/or multiple user-accounts/logins on the same device. The system may implement the policies specified by the user to control the content provided to devices on the user's network in real-time. Further, devices having fixed identifiers, such as a fixed user-agent string, such as a video game console or other dedicated-function device, may be identified to the system and associated with a content control policy directed to the device type, based on the fixed identifier.

The hosted services provisioning system may be used to block wardriving or other attempts to gain unauthorized access to a wired or wireless network of devices sharing a common IP address or the network access point used thereby. For example, the hosted services provisioning system may define a default content control policy for devices attempting to access the network which have no identifier, or whose identifier is unknown to the system for the common IP address. The default control policy may drop communications from these devices or may otherwise block access to the network from these devices. When a device with no identifier or an unknown identifier attempts to access the network, such as via a poorly secured network access point, i.e. router, of a user's home wireless network, such as through wardriving, the system may apply the default content control policy and drop the communication or otherwise prevent access to the network. In another embodiment, the content control policy may implement a one-time-use or pay-per-use policy for unidentified devices and route the user to a payment or other authorization mechanism to allow the user access on a limited, restricted or otherwise controlled basis. Alternatively or in addition the system may redirect unknown devices to a registration web page. The registration web page may force unknown users to register with the system, or the registration web page may cause the device of the user to provide a unique identifier with each communication from the device, i.e. tag the device.

The identifiers associated with each device and/or login may be encrypted and/or expire after a period of time or may otherwise need to be refreshed and/or renewed. The periodic expiration of the identifiers may assist in preventing misuse or other unauthorized use of the system. The periodic expiration of the identifiers may prevent attempts to gain unauthorized access to the system by spoofing, or imitating, the unique identifiers associated with each device. Alternatively or in addition, the system may redirect devices with expired identifiers to a registration web page. The registration web page may, for example, force the user to update their registration with the system or otherwise re-verify their identity.

The hosted services provisioning system may provide an organization or a government with control over the content accessible by users of their networks. A government or an organization may use the system to create content control policies specifying the content or type of content that should not be accessible to users on the network. The system may modify data on a user's device the first time the user accesses the network so that the device may be identified through communications originating from the device, such as adding a unique identifier to the user agent string of the user's device. The unique identifier may be used to identify the user and control the user's access to content as indicated by the policies created by the government or organization.

The system may enable an organization to implement services specific to a site a user is visiting, such as IP scrubbing or recording data exchanged between a user and a web site. For example, a user may attempt to circumvent an organization's email retention policies by using a web based email account. The system may be configured to record data posted by users to any posting, e.g. web based email, sites. Furthermore the system may be configured to record data posted by the user to message boards, web logs (blogs) or other web based systems.

The system may enable a service provider to provision and/or charge for services, such as internet access, online subscription based content, content control services, or other services, on a per user and/or device basis, as opposed to a per household basis. Since a household typically includes more than one user and/or device, charging for services on a per user or per device basis may be more profitable for a service provider than charging for services on a per household basis. Alternatively or in addition the system may enable a user to select/subscribe to a service on a per-device basis, such as to limit or prevent access to the service by other users sharing the common IP address, or otherwise avoid paying for unnecessary services.

The hosted services provisioning system provides an organization with universal control over each service provisioned to each user in the organization on a communication/request by communication/request basis. The system may operate transparent to the users by causing each user's device to provide a unique identifier with each request from the device. Operating transparent to the users provides advantages over systems which require a login, such as a proprietary browser or access portal of an online service, such as a subscription based service, by eliminating the need for the user to provide a password, or other credentials, eliminating the need for proprietary software to be installed on each user's device, or otherwise eliminating the need for the user to first establish a session with a gateway through which all of their communications are funneled. Furthermore, the disclosed embodiments allows the organization to control any services which may be provisioned to a user and/or device over a network, including services applied to a user's or device's communications regardless of the destination of their communications, not just the services which can be provisioned through the proprietary browser or access portal of an online service. The system also provides platform independence by not requiring proprietary software, such as a proxy client or proprietary browser, to be installed on each user's device. By providing platform independence, the system allows an organization to provision services to any network connected device of the users, not only the network connected devices which have specific proprietary software installed.

FIG. 1 provides a general overview of a hosted services provisioning system 100 for differentiating unique systems sharing a common address. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more content providers 110A-N, such as an entity that makes content available on a web page published on the web, a service provider 130, such as an internet service provider, and one or more users 120A-N, such as web surfers. The service provider 130 may provide the users 120A-N with access to the content provided by the content providers 110A-N, such as through the internet.

The service provider 130 may provide additional services to the users 120A-N, such as a content control service, virus, spyware or other malicious software protection service, denial of service protection, spam filtering, logging or recording services, subscription based content provisioning service, access control service or generally any service deliverable or provided via a network. The additional services may be hosted by the service provider 130. The users 120A-N may pay the service provider 130 for access to the additional services, such as on a pay-per-use basis or on a subscription basis. Alternatively or in addition thereto, an organization to which the users 120A-N belong to, such as an employer, may pay the service provider 130 to provision services to the users 120A-N as described herein. The content providers 110A-N may provide several forms of content to the users 120A-N, such as web content, IPTV content, VoIP call content, multimedia content, or generally any content that may be deliverable via a network.

The users 120A-N may access the services provided by the service provider 130, and the content provided by the content providers 110A-N, through an application, such as web browser or any application capable of processing the aforementioned content. It will be appreciated that the operation of the services provided by the service provider 130 may be substantially transparent to the users 120A-N depending on the type of service and, in some case, the users 120A-N may not be aware that a particular service is being provided. The application may be implemented by a device with a processor such as a personal computer, personal digital assistant, video game console/device, mobile phone, or any other wired or wireless device capable of implementing a web application. The device maybe any device capable of accessing a network, such as the internet.

A subset of the users 120A-N may reside in the same household, or otherwise within the same logical or physical boundary, such as within the same employer, and may have one account with the service provider 130. One or more of the users 120A-N in the household, such as a parent, may enroll the account of the household in one or more of the additional services provided by the service provider 130. Alternatively or in addition a subset of the users 120A-N may be employees of an organization and an administrator of the organization may enroll the users 120A-N in one or more of the services. The users 120A-N may each have their own internet accessible device and may use a router to share the services provided by the service provider 130 amongst each of the devices. Alternatively or in addition the users 120A-N may each have a separate login on a shared internet accessible device. One or more of the users 120A-N in the household may be a child, such as the user B 120B. Some of the content provided by the content providers 110A-N may not be suitable for children. In one example, the service provider 130 may provide a content control service that may allow a parent, such as the user A 120A, to identify content that should not be served to the internet accessible device of the user B 120B or to which the user B 120B is logged in.

In operation a head of household or administrator, such as the user A 120A, may log onto a web site provided by the service provider 130. The web site may allow the user A 120A to identify one or more services to be provisioned to each of the other users 120A-N sharing the internet service provided by the service provider 130. The user A 120A may identify one or more configuration parameters for each service to be provisioned to each of the users 120A-N. For example, in the case of a content control service, the user A 120A may identify content control policies specifying content that should not be provided to each of the users 120A-N. Alternatively or in addition the content control policies may specify the only content that should be provided to each of the users 120A-N.

The users 120A-N may then log onto the website from each of the internet accessible devices, and/or logins. Upon logging onto the website from each device and/or login, the service provider 130 may add a unique identifier to each device so that the device and/or login may be identifiable through communications originating from the device and/or login. Alternatively, the user A 120A may log onto the website from one device and define all of the devices or logins of other users on their network to the system. Subsequent to this definition process, as each of those devices or users attempts to access the Internet for the first time, the service provider 130 may add the unique identifier to each device so that the device and/or login may be identifiable through communications, such as communications, originating from the device and/or login. The system 100 may associate the unique identifier with the provisioned services identified by the user A 120A for the user of the device and/or login. The unique identifier may expire after a period of time and may need to be refreshed by the user A 120A. In yet another alternative embodiment, as each device or login is used to access the Internet for the first time, the user may be redirected to a registration page where, subject to approval, authorization and/or authentication as required, the system 100 may associate a unique identifier with the device and/or login to which default services are provisioned, which may include blocking access or providing limited access until a parent or administrator provides further authorization for increased functionality.

The unique identifier may be added to data that is included in each communication, e.g. HTTP request, such as the user agent string, described in more detail below. A token may be added to the user agent string associated with the device and/or login of the users 120A-N. The service provider 130 may then associate the token with the services to be provisioned to the particular user. When a communication is received from the device and/or login, the modification to the user agent string may be used to trace the communication back to the device and/or login. In the case of separate logins on one device, each login may have a separate data space on the device, and each separate data space may store a separate user agent string. Alternatively or in addition the unique identifier may be stored and retrieved by using ActiveX controls.

The modification of data on the devices and/or logins of the users 120A-N ensures that the users 120A-N may be identified independent of the IP addresses which may identify the source of the data packets generated by their device. Some home routers may use NAT to share access to the services provided by the service provider 130. The use of NAT may cause the communications originated from any device on the network to appear to originate from the same IP address. Since all of the devices share one IP address it may be difficult for a service provider 130 to distinguish among devices or users and provision differentiated services to each of the individual devices based on the IP address. In addition, the users 120A-N may access the internet through multiple access points provided by the service provider 130, such as at home, at a coffee shop, at an airport, or generally any location where a service provider 130 may provide access to the internet. The system 100 may provide the provisioned services to the users 120A-N via any access point providing internet service from the service provider 130.

In the example of the Open Systems Interconnection Basic Reference Model (OSI Model), the use of NAT may render the network layer (layer 3) and transport layer (layer 4) non-unique. Thus, the system 100 cannot identify individual devices based on the network layer or the transport layer in a network implementing NAT. However, by adding a token to the user agent string the system 100 can process the application layer (layer 7) of the OSI Model to identify individual devices. By processing the application layer, the system 100 is able to overcome the limitations of non-unique network and transport layers in a network implementing NAT.

In one embodiment of the content control service, content control may be accomplished by categorizing or rating content based on the appropriate type of audience or other factors, such as by age-appropriateness, whereby the policies set by the users 120A-N may define which ratings or categories are allowed. The service provider 130 may maintain a list of ratings of the content providers 110A-N. The ratings may indicate whether the content provided by the content providers 110A-N may be appropriate for a given set of the users 120A-N, such as children. The service provider 130 may obtain the ratings from a third party or may maintain ratings internally. If one of the users 120A-N, such as the user B 120B, requests content from one of the content providers 110A-N, such as the content provider A 110A, the system 100 may compare the rating of the content provider A 110A with the content control policy of the user B 120B which specifies which ratings are allowable. If the content control policy does not allow content described by the rating, then the user B 120B will not be provided the content. Otherwise the user B 120B may be provided the content. If there is no rating for the content provider A 110A, the service provider 130 may restrict access to the content provider A 110A and notify the administrator and/or parent. The administrator and/or parent may log into the system 100 and may identify whether the user B 120B may access the content provided by the unrated content provider A 110A. The administrator and/or parent may be able to rate the content provider A 110A and apply the rating to the control policies of each of the other users 120A-N in the household and/or account.

The first time a user, such as the user A 120A, attempts to access a service provisioned by the service provider 130 the service provider 130 may add a data representing a unique identifier to the device and/or login of the user A 120A. The service provider 130 may also require that the user A 120A provide identifying information, such as a name, address, social security number, or generally any other information capable of identifying the users A 120A, such as a credit card number, etc. The service provider 130 may use the identifying information to look up services provisioned to the user A 120A. The provisioned services may have been previously identified by a parent and/or administrator. In the case of a content control service, if the service provider 130 cannot locate a previously identified control policy, the service provider 130 may enforce a default control policy, such as the most restrictive control policy, and notify the parent and/or administrator that a policy should be identified for the user A 120A. The parent and/or administrator may then log into the system 100 and identify a control policy for the user A 120A.

Alternatively or in addition, entities such as governments, corporations, or other entities may use a content control service to control the access their citizens, employees, or members may have to content through the networks of the entities. The entities may identify a master control policy that may apply to all of the users 120A-N of their networks. Alternatively or in addition, the entities may identify control policies for groups of the users 120A-N. The entities may pre-configure the internet accessible devices of the users 120A-N to include identifying unique identifiers, or may utilize any of the aforementioned techniques for identifying the users 120A-N.

In operation, a user A 120A may request a service provided by the service provider 130 by sending a communication comprising the request. The service provider 130 may identify the account associated with the user A 120A, such as a household, based on the IP address of the user A 120A. The service provider 130 may then determine if the account associated with the IP address has registered for the service requested by the user A 120A. If the account is not registered for the service requested by the user A 120A, the service provider 130 may not allow access to the service. Alternatively, if the account is not registered for the requested service, the service provider 130 may allow the user A 120A to register for the service. In order to identify the IP address associated with each account, the service provider 130 may maintain a data structure containing an IP address associated with the media access control ("MAC") address of each account's device and/or router. The service provider 130 may monitor dynamic host protocol ("DHCP") relay messages to update the data structure when a new IP address is released to the MAC address of the account. In alternative embodiment, deep packet inspection, as described below, may be used to obtain the unique identifier, as described, which itself may be used to determine what services should or should not be provisioned to the user alone or in combination with the IP address.

If the account has registered for the requested service, such as a content control service, the service provider 130 may use a procedure, such as deep packet inspection, to retrieve information from the communication from the user A 120A, such as by intercepting the communications and analyzing the contents thereof as will be described. The deep packet inspection may be able to identify the unique identifier within the communication. For example, in the case of a content control service, the deep packet inspection may be able to identify a token added to the user agent string, and data identifying the content provider A 110A, such as the domain name or IP address of the content provider A 110. The service provider 130 may then retrieve any configuration parameters associated with the unique identifier, such as a content control policy associated with the unique identifier and the rating of the content provider A 110A, from a data store. The rating of the content provider A 110A may be compared against the content control policy to determine whether the content of the content provider A 110A should be provided to the user A 120A.

In the example of the content control service, if the content control policy does not allow the user A 120A to access the content, the service provider 130 may perform one or more actions, such as preventing the content from being provided to the user A 120A by deleting the communication/request. The administrator and/or parent may identify one or more actions to be performed when the users 120A-N attempt to the content restricted by their content control policies. Alternatively or in addition an action may be redirecting the user A 120A to a web site noting the attempt to access content prohibited by their content control policy.

More detail regarding the aspects of deep packet inspection, as well as the structure, function and operation of inspecting packets to retrieve a token from the user agent string and a hostname of a requested name, as mentioned above, can be found in commonly owned U.S. patent application Ser. No. 11/188,173, filed on Jul. 22, 2005, entitled, "A SYSTEM AND METHOD FOR PROCESSING PACKETS USING LOCATION AND CONTENT ADDRESSABLE MEMORIES," which is hereby incorporated herein by reference in its entirety. The systems and methods herein associated with deep packet inspection may be practiced in combination with methods and systems described in the above-identified patent applications incorporated by reference.

Figure 2:
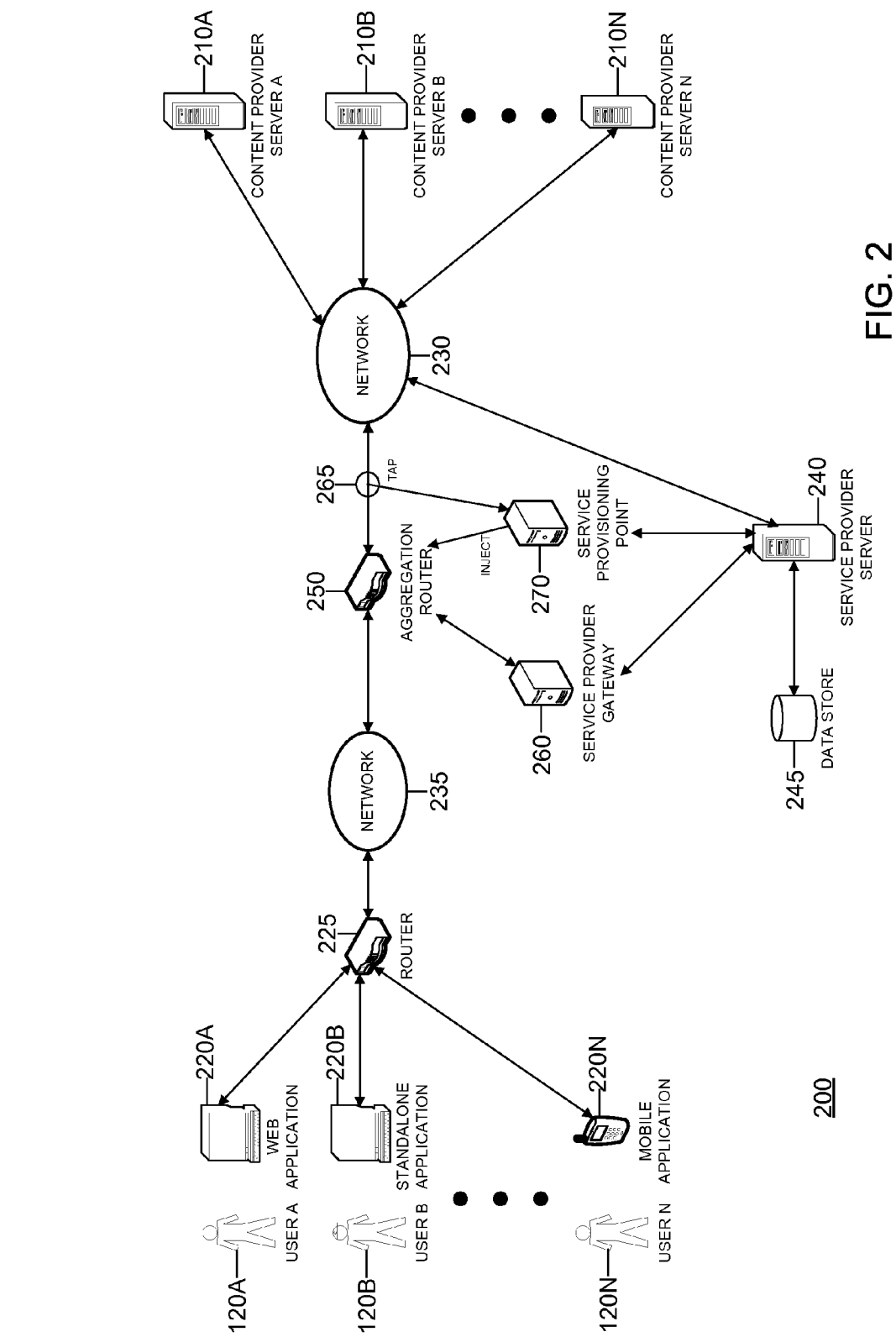
FIG. 2 is block diagram of a network environment implementing the system of FIG. 1 or other systems for differentiating unique systems sharing a common address.

FIG. 2 provides a simplified view of a network environment 200 implementing the system of FIG. 1 or other systems for differentiating unique systems sharing a common address. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more content provider servers 210A-N, and one or more web applications, standalone applications, mobile applications 220A-N, which may collectively be referred to as client applications 220A-N for the users 120A-N, or as the client devices 220A-N of the users 120A-N. The network environment 200 may also include a router 225, a network 230, a network 235, a service provider server 240, a data store 245, an aggregation router 250, a service provider gateway 260, an optical tap 265, and a service provisioning point 270. The system 100 may include several network environments 200, spread out across the geographic spread of the users 120A-N. The service provider 130 may ensure synchronization of the data across each of the network environments 200.

The client devices 220A-N may share a connection to the service provider gateway 260 through the use of a router 225. The router 225 may use NAT to share the connection, which may result in each of the individual devices 220A-N appearing to the service provider gateway 260 to share a common IP address. The aggregation router 250 may be a central access point for several of the users 120A-N. There may be several aggregation routers 250, based on the geographic spread of the users 120A-N.

The service provider server 240, service provider gateway 260, and service provisioning point 270 may each represent multiple linked computing devices. Some or all of the components of the service provider gateway 260 and/or service provisioning point 270 may be part of the service provider server 240. The service provider gateway 260 may provide the one or more web applications, standalone applications, mobile applications 220A-N with access to content provided by the content provider servers 210A-N through the networks 230, 235. The service provider 130 may have several service provider gateways 260 spread across the geographic spread of the users 120A-N. The traffic of the users 120A-N may be aggregated to each service provider gateway 260 through an aggregation router 250. Each service provider gateway 260 may be accompanied by a service provisioning point 270 for the system 100. The service provisioning point 270 may monitor the communications of the users 120A-N through the service provider gateway 260, and may allow or prevent the users 120A-N access to services specified in the service specifications of the users 120-N. For example, in the case of a content control service, the service provisioning point 270 may prevent the users 120A-N access to content specified in the content control policies of the users 120-N.

The service provisioning points 270 may be deployed in several configurations. For example, the service provisioning points 270 may be deployed adjacent to the aggregation routers 250. In this configuration the service provisioning points 270 may receive an optical tap 265 of the traffic to monitor the communications of the users 120A-N. In addition, a router port on the aggregation router 250 may be utilized to give the service provisioning points 270 a point to inject traffic into the communications of the users 120A-N. The injection may use a standard access link looking to the aggregation router 250 like normal traffic. Since the service provisioning points 270 may be adjacent to the users 120A-N, from a latency point of view, any active response may be able to outrun the round-trip to a website and back, which may enable the response from the service provisioning point 270 to reach the users 120A-N first. There may be no single point of failure in this configuration of service provisioning points 270. In addition, one or more of the service provisioning points 270 may be used for service high availability should it be desired, as well as the network availability assurance. This configuration may allow for sniping and may allow redirection of communications to service provisioning notification web sites.

Alternatively or in addition the service provisioning points 270 may be deployed as active inline devices upstream of the users 120A-N providing content analysis and control. In this configuration the service provisioning points 270 may need to be deployed in a fault tolerant architecture, such as with optical bypass modules and redundant equipment to guarantee service availability. This configuration may provide direct control and may allow redirection of communications to service provisioning notification web sites.

The data store 245 may be operative to store data, such as data relating to interactions with the users 120A-N. The data store 245 may include one or more relational databases or other data stores that may be managed using various known database management techniques, such as, for example, SQL and object-based techniques. Alternatively or in addition the data store 245 may be implemented using one or more of the magnetic, optical, solid state or tape drives. The data store 245 may be in communication with the service provider server 240. In the example of a content control service, the data store may also store ratings of the content providers 110A-N and/or content control policies of the users 120A-N.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The content provider servers 210A-N may communicate with the service provider server 240 via the network 230. The service provider server 240 and the content provider servers 210A-N may communicate with the users 120A-N via the networks 230, 235, through the web applications, standalone applications or mobile applications 220A-N. The users 120A-N may access content and/or services provided by the content provider servers 210A-N through the service provider gateway 260 and/or service provider server 240.

The web applications, standalone applications and mobile applications 220A-N, and content provider servers 210A-N, may be connected to the networks 230, 235 in any configuration that supports data transfer. This may include a data connection to the network 230 that may be wired or wireless. The data connection may be through the router 225. Any of the web applications, standalone applications and mobile applications 220A-N may individually be referred to as a client application. The web application 220A may run on any platform that supports web content, such as a web browser or a computer, a mobile phone, personal digital assistant (PDA), pager, network-enabled television, digital video recorder, such as TIVO®, video game console/device, automobile and/or any appliance or device capable of data communications.

The standalone application 220B may run on a machine that may have a processor, memory, a display, a user interface and a communication interface. The processor may be operatively connected to the memory, display and the interfaces and may perform tasks at the request of the standalone application 220B or the underlying operating system. The memory may be capable of storing data. The display may be operatively connected to the memory and the processor and may be capable of displaying information to the user B 120B. The user interface may be operatively connected to the memory, the processor, and the display and may be capable of interacting with a user B 120B. The communication interface may be operatively connected to the memory, and the processor, and may be capable of communicating through the networks 230, 235 with the content provider servers 210A-N. The standalone application 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The mobile application 220N may run on any mobile device that may have a data connection. The data connection may be a cellular connection, a wireless data connection, an internet connection, an infra-red connection, a Bluetooth connection, or any other connection capable of transmitting data.

The service provider server 240 and content provider servers 210A-N may include one or more of the following: an application server, a data store, such as the data store 245, a database server, a middleware server, and an advertising services server. The service provider server 240 may exist on one machine or may be running in a distributed configuration on one or more machines. The service provider server 240 may be referred to as the server. The service provider server 240 and the content provider servers 210A-N may receive communications from the users 120A-N, such as HTTP requests, and may serve pages to the users 120A-N based on their communications.

The service provider server 240, the content provider servers 210A-N, the service provider gateway 260, the service provisioning point 270, and the web applications, standalone applications, mobile applications 220A-N may be one or more computing devices of various kinds, such as the computing device in FIG. 17. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite.

For example, the web application 220A may employ HTTP to request information, such as a web page, from a web server, which may be a process executing on the content provider servers 210A-N. The HTTP request may be monitored by the service provider gateway 260 to determine if the requested content should be served to the user A 120A. If the content requested should not be served to the user A 120A, the service provider gateway 260 may block the request.

There may be several configurations of database servers, such as the data store 245, application servers, middleware servers and advertising services servers included in the service provider server 240. Database servers may include MICROSOFT SQL SERVER®, ORACLE®, IBM DB2® or any other database software, relational or otherwise. The application server may be APACHE TOMCAT®, MICROSOFT ITS®, ADOBE COLDFUSION®, YAPACHE® or any other application server that supports communication protocols. The middleware server may be any middleware that connects software components or applications. The middleware server may be a relevancy engine, a context matching engine, or any other middleware.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
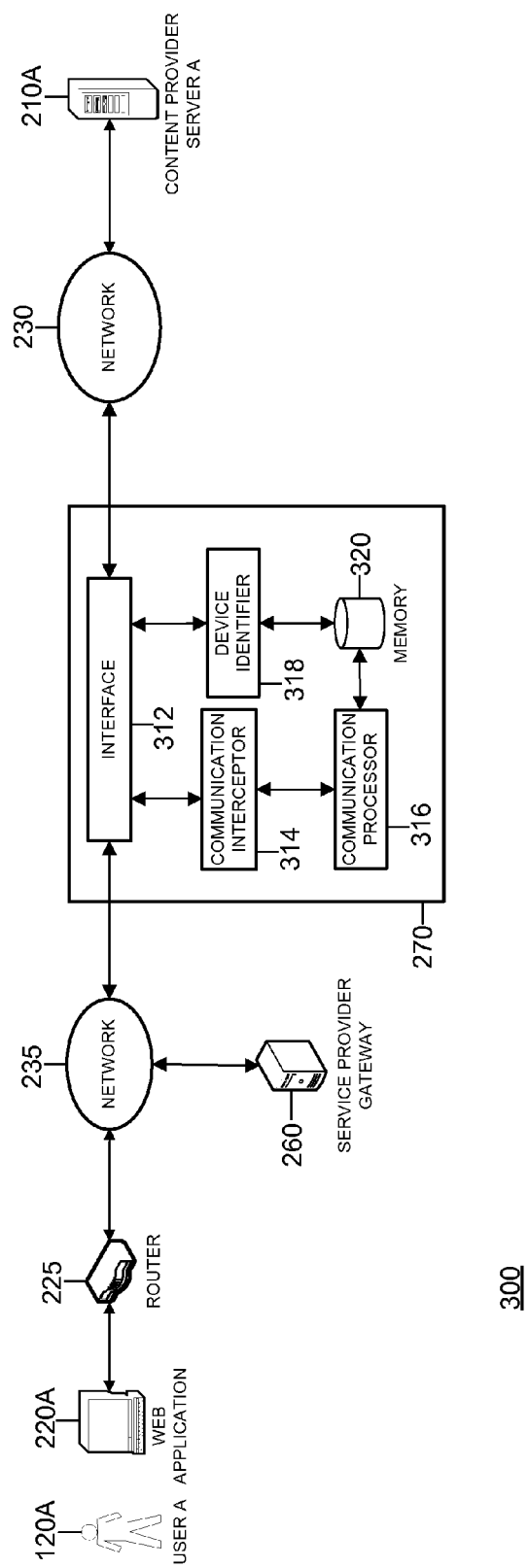
FIG. 3 is a block diagram illustrating service provisioning point components of the systems of FIG. 1 and FIG. 2, or other systems for differentiating unique systems sharing a common address.

FIG. 3 illustrates service provisioning point components in a system 300 for differentiating unique systems sharing a common address. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 300 may include a user A 120A, a web application 220A, a router 225, a network 230, a network 235, a content provider server A 210A, a service provider gateway 260, and a service provisioning point 270. The service provisioning point 270 may include an interface 312, a communications interceptor 314, a communication processor 316, a device identifier 318 and a memory 320.

The interface 312 may be operative to receive a designation of each of the client devices 220A-N, and a specification of a corresponding device specific service to be provisioned. The device identifier 318 may be coupled with the interface 312 and may be operative to cause each of the client devices 220A-N to provide a unique identifier with each communication originated by the device, and/or each user thereof. The unique identifier may uniquely identify each device from at least the other client devices 220A-N, independent of the common address. The device identifier 318 may also be operative to store the unique identifier and the associated specification of the client devices 220A-N in the memory 320. The communication interceptor 314 may be operative to intercept a communication originated by one of the client devices 220A-N for transmission to at least one intended destination, and determine the unique identifier associated with the device, and/or user thereof. The communication may not otherwise be able to identify the originating device from the other client devices 220A-N. The communication processor 316 may be coupled with the memory 320 and the communication interceptor 314 and may be operative to determine the associated specification based on at least the unique identifier. The communication processor 316 may also be operative to process the communication in accordance with the associated specification.

In operation the user A 120A may use the web application 220A to request content provided by the content provider server A 210A through the service provider gateway 260. The user A 120A may use a router 225 to share the internet service provided by the service provider 130 with other users 120B-N on a network. The request for content may be communicated through the router 225 and the network 235 to the service provisioning point 270. The communication interceptor 314 may monitor items communicated by the user A 120A. When the communication interceptor 314 identifies a communication from the user A 120A, the communication interceptor 314 may intercept the communication prior to receipt by the intended destination of the communication, e.g. the content provider A 210A. The communication interceptor 314 may then use deep packet inspection to retrieve the token identifying the user A 120A from the user agent string, and to retrieve the domain name of the content provider A 110A. The communication interceptor 314 may use content analysis to interpret the token, such as to identify the particular device and/or user the communication originated from.

The communication interceptor 314 may communicate the token and domain name to the communication processor 316. The communication processor 316 may use the token and the domain name to retrieve the specification of any services associated with the user A 120A, and/or the device, from the memory 320, such as a policy data store. In the example of a content control service associated with the user A 120A, the communication processor 316 may use the token and the domain name to retrieve the rating of the content provider A 110A, and the content control policy associated with the user A 120A, from the memory 320, such as a policy data store. The communication processor 316 may process the content control policy to determine if the rating associated with the content provider A 110A is allowed by the control policy of the user A 120A. If the content from the content provider A 110A is allowed, the communication processor 316 may allow the content to be communicated to the user A 120A, such as by releasing or otherwise allowing the communication/request to continue to the intended destination. If the content from the content provider A 110A is not allowed the communication processor 316 may prevent the content from the content provider A 110A from being communicated to the user A 120A, such as by dropping or deleting the communication/request or otherwise blocking the response thereto from the content provider A 110A. Alternatively or in addition the communication processor 316 may perform any of the aforementioned actions when the user A 120A attempts to access prohibited content, or may perform any other action indicated by an administrator.

Figure 4:
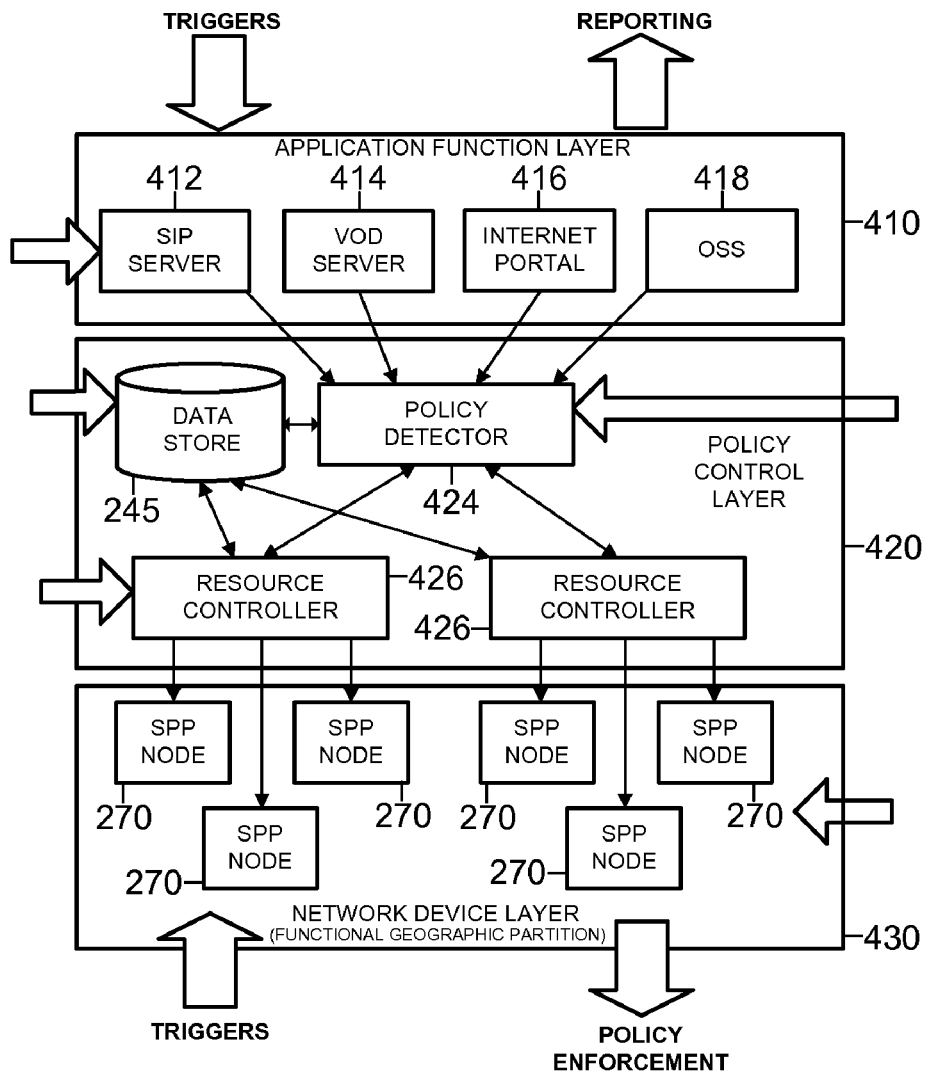
FIG. 4 is a block diagram illustrating the functional layers of a content control service utilizing the system of FIG. 1 and FIG. 2, or other systems for differentiating unique systems sharing a common address.

FIG. 4 illustrates the functional layers of a content control service 400 utilizing a hosted services provisioning system for differentiating unique systems sharing a common address. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The service 400 may include an application function layer 410, a policy control layer 420, and a network device layer 430. The application function layer 410 may include a session initiation protocol ("SIP") server 412, a video on demand ("VOD") server 414, an internet portal 416, and operations support systems ("OSS") 418. The policy control layer 420 may include a data store 245, a policy detector 424, and one or more resource controllers 426. The network device layer 430 may include one or more service provisioning point ("SPP") nodes 270.

In operation the OSS 418 interfaces may be used to store content ratings of content providers 110A-N in the memory 320, such as a policy data store. Alternatively or in addition the SIP server 412 may be used to store call block lists in the data store 245 and the VOD server 414 may be used to store IPTV channel ratings in the data store 245. The user A 120A may use the internet portal 416 to store the control policy for each device and/or login on the network of the user A 120A in the data store 245. The policy director 424 may coordinate the communication of ratings and/or control policies, and may store the ratings and/or control policies in the policy data store 245.

The resource controllers 426 may function with the policy director 424 to provision the appropriate domain, user, and content control policies into the service provisioning points 270 at the determined geographic locations. The service provisioning points 270 may be spread out geographically depending upon the density of users 120A-N in a given area.

The resource controllers 426 may deliver new policies to the service provisioning points 270 as they are added to the data store 245. The ratings of the content providers 110A-N may be supplied by a third party in a industry standard format. Upon deployment of the ratings to the service provisioning points 270, the resource controllers 426 may adapt the ratings to a particular XML format, such as the one shown in FIG. 15 below.

Figure 5:
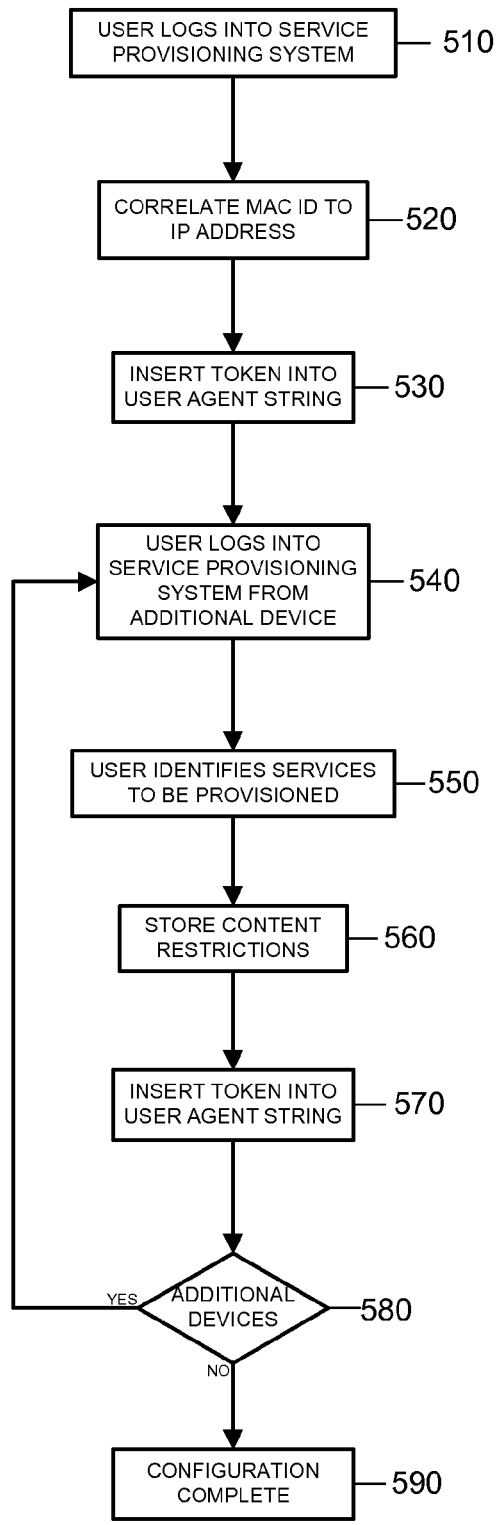
FIG. 5 is a flowchart illustrating the operations of configuring the control of items communicated to devices in the systems of FIG. 1 and FIG. 2, or other systems for differentiating unique systems sharing a common address.

FIG. 5 is a flowchart illustrating the operations of configuring the control of items communicated to devices in the systems of FIG. 1 and FIG. 2, or other systems for differentiating unique systems sharing a common address. At block 510 an administrative user and/or parent, such as the user A 120A, may log into the service provisioning system, such as through a web interface. At block 520 the service provider server 240 may store the MAC address associated with the user A 120A and the IP address associated with the user A 120A in the data store 245. If the user A 120A is accessing the system 100 through a router 225, the MAC address associated with the user A 120A may be the MAC address of the router 225. The service provider server 240 may monitor DHCP requests in order to monitor changes to the IP address associated with the MAC address. If the IP address changes the service provider server 240 may update the data store 245 to reflect the change.

At block 530 the service provider server 240 may cause the device of the user A 120A to insert a token into the user agent string of the device and/or of the login of the user A 120A. Different procedures for inserting a token into the user agent string may be utilized for different operating systems. For example, for some Windows based operating systems a modification may be made to the registry in order to add additional tokens to the user agent string. The Windows based operating systems may maintain a separate user agent string for each user with a separate login for the operating system.

At block 540, the user A 120A may log into the system 100 from an additional device, such as the internet accessible device of the user B 120B. Alternatively or in addition if the users 120A-N share an internet accessible device, the user A 120A may log into the system 100 from a login of the user B 120B. At block 550 the user A 120A may specify the specification of services to be provisioned to the device and/or login of the user B 120B. At block 560 the service provider server 240 may store the specification, such as in the data store 245. At block 570 the service provider 140 may insert a token into the user agent string of the device and/or login of the user B 120B. The token may then be associated with the user B 120B and the specification identified by the user A 120A.

At block 580, the user A 120A may determine whether there are additional devices to add to the system 100. If there are additional devices of other users 120A-N, the system 100 may return to block 540 where the user A 120A may add additional devices to the system 100. Once the user A 120A has logged into the system 100 from each device on their network, the system 100 may move to block 590. At block 590 the configuration of the system 100 may be complete.

Figure 6:
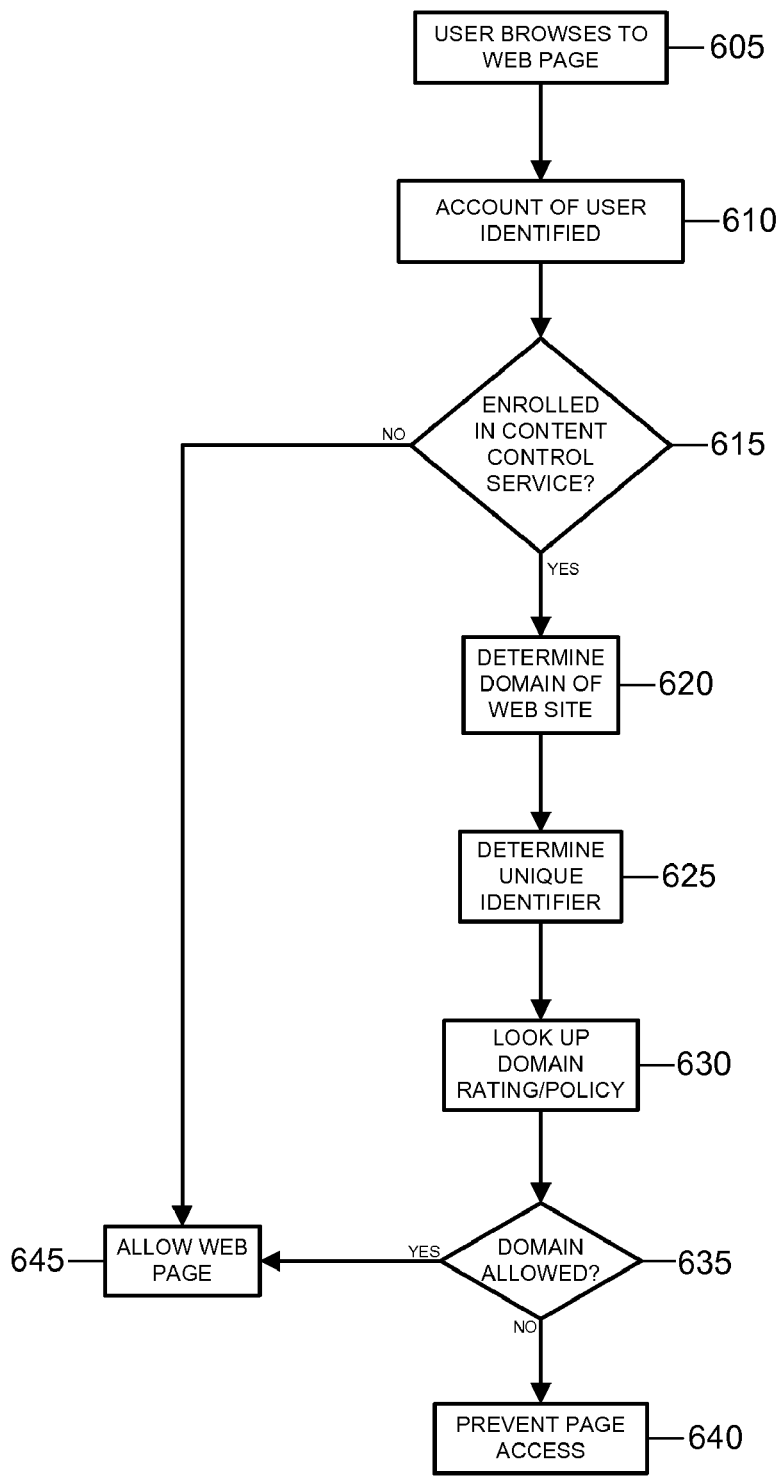
FIG. 6 is a flowchart illustrating the operations of a content control service utilizing the systems of FIG. 1 and FIG. 2, or other systems for differentiating unique systems sharing a common address.

FIG. 6 is a flowchart illustrating the operations of a content control service utilizing the systems of FIG. 1 and FIG. 2, or other systems for differentiating unique systems sharing a common address. At block 605 a user, such as the user A 120A, may submit a communication to browse to a web page provided by a content provider, such as the content provider A 110A. The communication may be intercepted by the communication interceptor 314 prior to receipt by the content provider, e.g. content provider A 110A. At block 610 the communication processor 316 may look up the source IP address of the communication and determine whether the account of the user A 120A is registered for the content control service. At block 615, if the account of the user A 120A is not registered for the content control service, then the system 100 may move to block 645. At block 645 the user A 120A may be provided with the web page of the content provider A 110A.

If, at block 615, the account of the user A 120A is enrolled in the content control service then the system 100 may move to block 620. At block 620 the service provider server 240 may determine the domain name of the web site the user A 120A requested, such as the domain of the content provider A 110A. At block 625 the service provider server 240 may determine the unique identifier associated with the user A 120A, such as the token added to the user agent string. At block 630 the service provider server 240 may look up the rating of the content provider A 110A, and may look up the content control policy associated with the unique identifier of the user A 120A. At block 635 the service provider server 240 may determine whether the domain of the content provider A 110A is allowed under the content control policy associated with the user A 120A. If the domain is allowed, the system 100 may move to block 645 and allow the web page to be provided to the user A 120A, such as by releasing the intercepted communication so that it may reach the content provider, e.g. content provider A 110A. If the domain is not allowed, the system 100 may move to block 640. At block 640 the service provider server 240 may prevent the user A 120A from accessing the requested web page, such as by deleting the communication and thereby preventing it from reaching the content provider, e.g. content provider A 110A. Alternatively or in addition the service provider server 240 may perform any of the aforementioned actions associated with an attempt by a user to access a web page their content control policy restricts.

Figure 7:
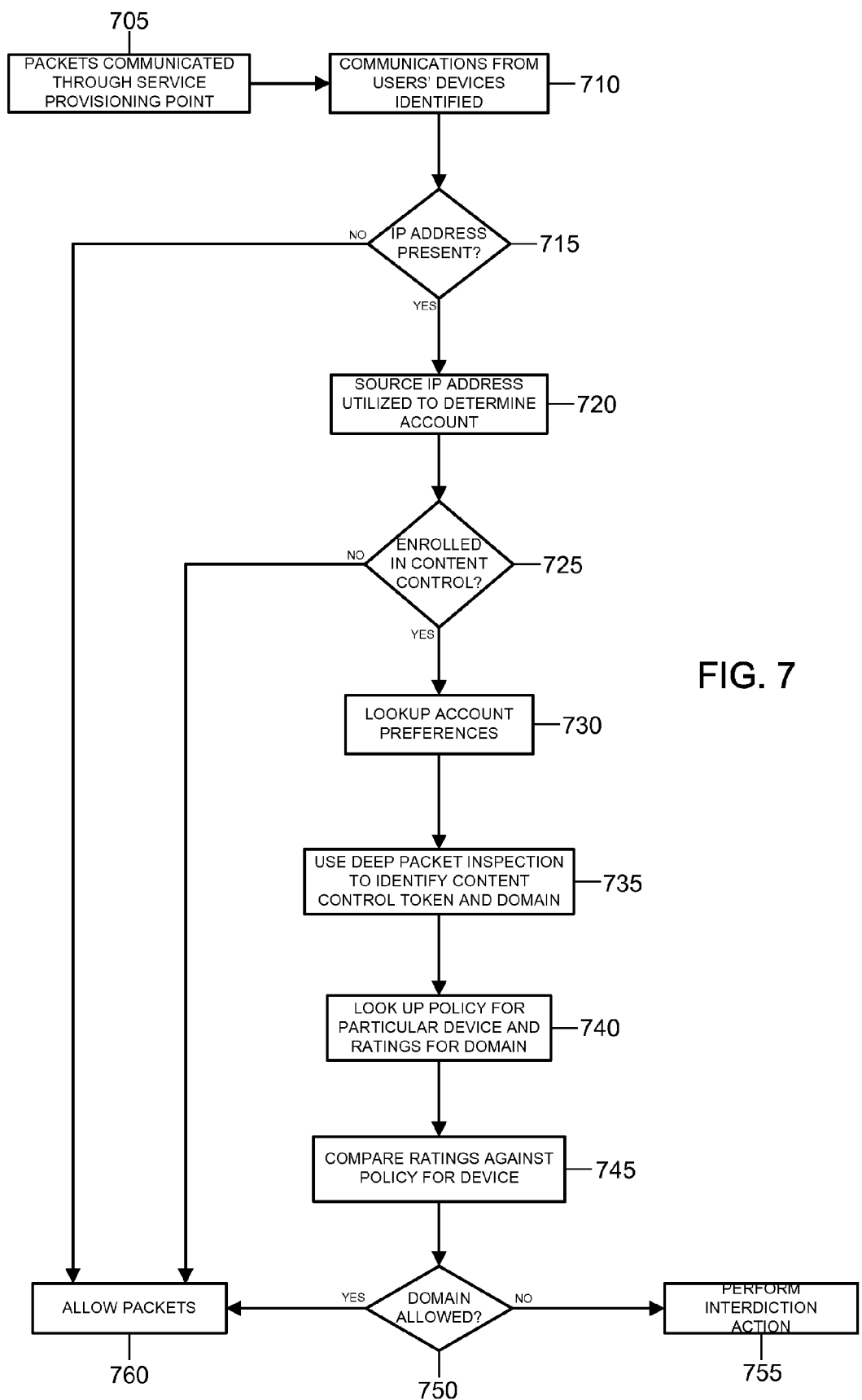
FIG. 7 is a flowchart illustrating the operations of a content control service using deep packet inspection to control items communicated to a device in the systems of FIG. 1 and FIG. 2, or other systems for differentiating unique systems sharing a common address.

FIG. 7 is a flowchart illustrating the operations of content control service using deep packet inspection to control items communicated to a device in the systems of FIG. 1 and FIG. 2, or other systems for differentiating unique systems sharing a common address. At block 705 packets may be communicated by a service provisioning point 270, such as through a tap 265 of a service provider gateway 260. At block 710 the communication interceptor 314 may intercept communications from the devices of the users 120A-N, such as hypertext transfer protocol ("HTTP") requests, prior to the receipt of those requests by the intended destination thereof. At block 715 the service provider server 240 may determine if an IP address is present in the communication. If there is not an IP address present the system 100 may move to block 760. At block 760 the system 100 may allow the packets to be communicated.

If, at block 715, an IP address is present, the system 100 may move to block 720. At block 720 the service provider server 240 may use the IP address to determine the household, or account, associated with the IP address. At block 725 the service provider server 240 may determine whether the household associated with the IP address has enrolled in the content control service. The content control service may be offered to the users 120A-N on a pay-per-use basis, on a subscription basis, or may be offered as a standard service. If, at block 725, the service provider server 240 determines that the account associated with the IP address is not enrolled in the content control service, the system may move to block 760. At block 760 the service provisioning point 270 may allow the packets to be communicated.

If, at block 725, the service provider server 240 determines that the account associated with the IP address is enrolled in the content control service, then the system 100 may move to block 730. At block 730 the service provider server 240 may look up the preferences of the account, such as the content controls for each user and/or device associated with the account. At block 735 the service provisioning point 270 may use deep packet inspection to identify a content control identifier associated with the requesting user/device, such as a content control token in the user agent string, and the domain of the content provider requested, such as the content provider A 110A. At block 740 the service provisioning point 270 may look up the content control policy associated with the device identified by the token, and a rating of the content provider identified by the domain. At block 745 the service provisioning point 270 may compare the rating of the domain with the content control policy associated with the device. At block 750 the service provisioning point 270 may determine whether the content control policy allows content from the domain. The determination may be based on the rating of the domain and the rating of content not allowed by the content control policy.

If, at block 750, content from the domain is allowed by the content control policy, then the system 100 may move to block 760. At block 760 the service provisioning point 270 may allow the packets to be communicated. Alternatively or in addition, the service provisioning point 270 may remove the content control token from the user agent string before allowing the packets to be communicated. It may be desirable to remove the content control token in cases where the content control token includes personal, or otherwise identifying or sensitive, information. If, at block 750, the service provisioning point 270 determines that content from the domain is not allowed by the content control policy, then the system 100 may move to block 755. At block 755, the system 100 may perform an interdiction action, such as dropping the packets if the system 100 is inline, or performing resets if the system 100 is deployed in a real-time monitoring architecture. Alternatively, an action may be to redirect the communication to the content control administration web site login noting the violation. A user may be able to enter the administrator login/password to over-ride the restriction. Alternatively or in addition, if the user agent string does not include a content control token, the system 100 may redirect the communication to the content control administration web site.

Figure 8:
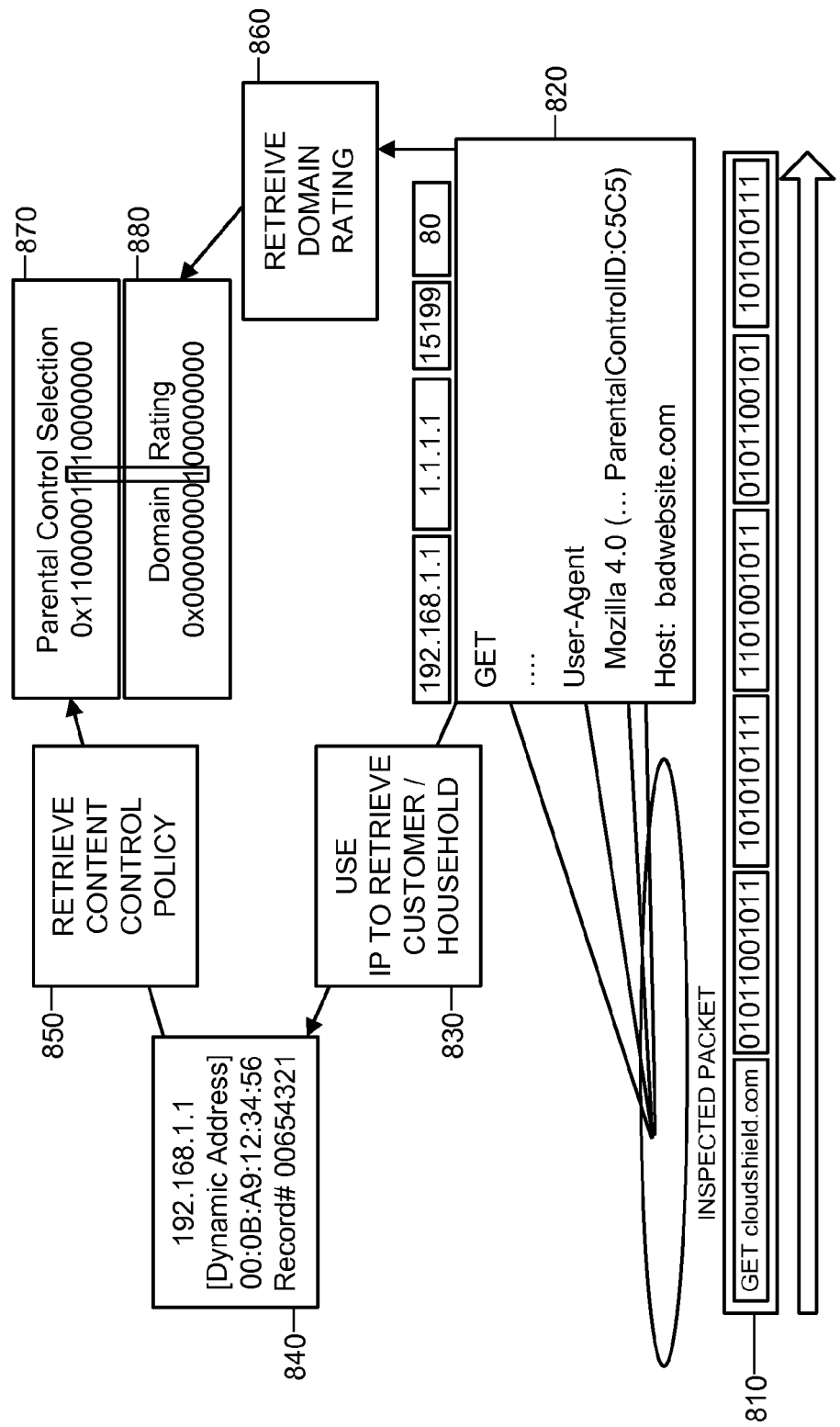
FIG. 8 is a block diagram illustrating a content control service implementing deep packet inspection in the systems of FIG. 1 and FIG. 2, or other systems for differentiating unique systems sharing a common address.

FIG. 8 illustrates a content control service implementing deep packet inspection in the systems of FIG. 1 and FIG. 2, or other systems for differentiating unique systems sharing a common address. Block 810 may show packets flowing by the service provisioning point 270, including communications from the users 120A-N, such as an HTTP request of "GET cloudshield.com." Block 820 may represent an inspected packet. The deep packet inspection may be used to retrieve the content control token, such as the ParentalControlID, from the user agent string. Deep packet inspection may also be used to determine the domain name of the content provider hosting the requested content, such as "badwebsite.com." At block 830, the source IP address may be used to determine the account and/or household associated with the IP address. Block 840 may show the account record number associated with the IP address and MAC address. At block 850 the ParentalControlID token from the user agent string may be used to retrieve the content control policy associated with the requesting user/device. At block 860 the domain rating may be retrieved for the content provider hosting the requested content.

At block 870 and 880 the content allowed by the content control policy may be compared against the rating of the content provider hosting the requested content. The content control policy may specify whether content of each rating level is allowable for the user. The content control policy and the domain rating may be binary strings. The system 100 may perform a logical AND comparison of the content control policy and the rating of the selected domain, to determine if content having the rating is allowable for the given user. The logical AND comparison of the content control policy and the rating of the domain may be discussed in more detail in FIG. 15.

Figure 9:
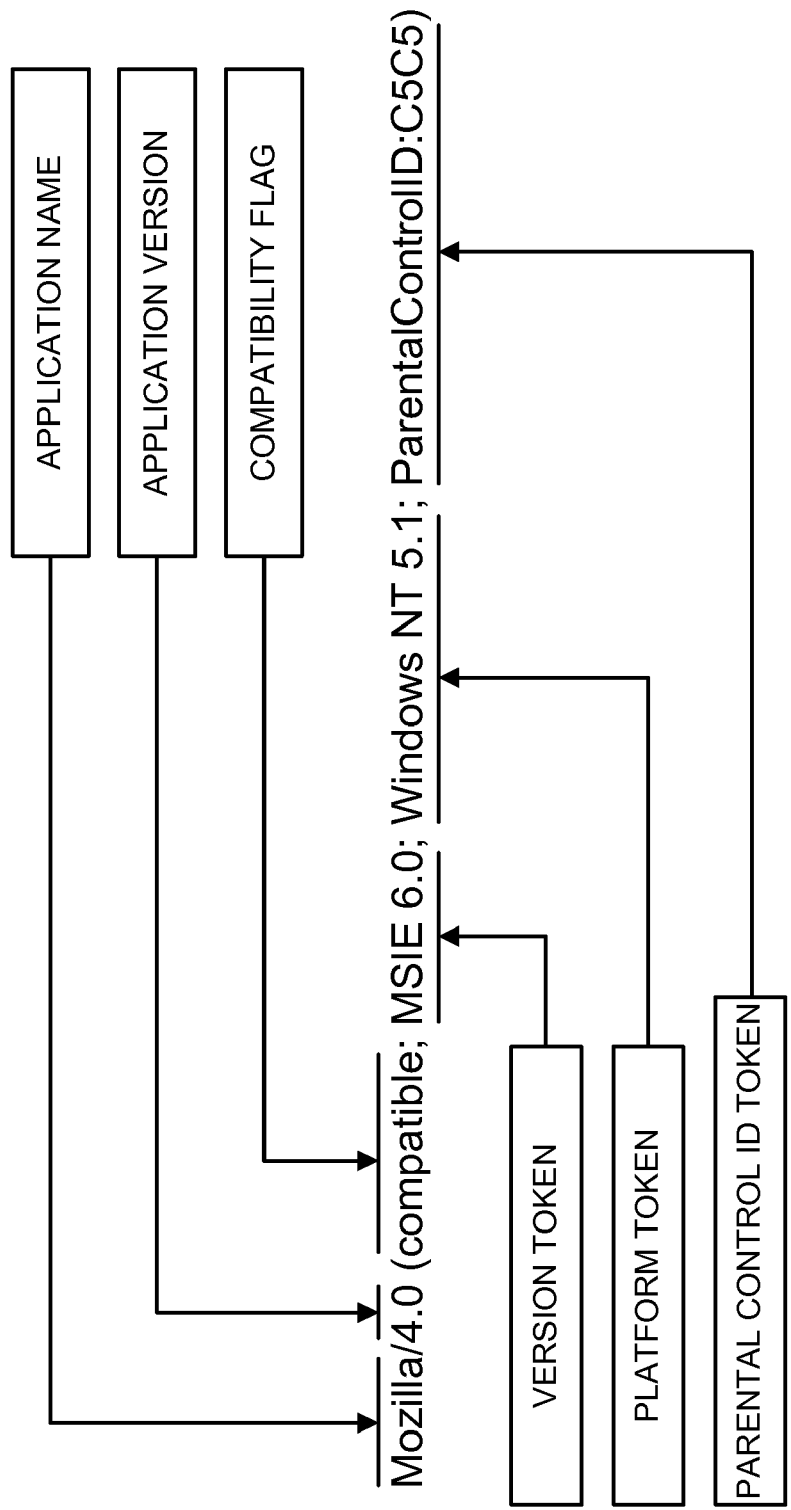
FIG. 9 is an illustration of a user agent string in the systems of FIG. 1 and FIG. 2, or other systems for differentiating unique systems sharing a common address.

FIG. 9 illustrates an exemplary user agent string in the systems of FIG. 1 and FIG. 2, or other systems for differentiating unique systems sharing a common address. A user agent is the client application used with a particular network protocol; the phrase is most commonly used in reference to those which access the World Wide Web, but other systems such as SIP uses the term user agent to refer to the user's phone. Web user agents range from web browsers to search engine crawlers ("spiders"), as well as mobile phones, screen readers and braille browsers used by people with disabilities. When Internet users visit a web site, a text string, referred to herein as a "user agent string," is generally sent to identify the user agent to the server. This forms part of the HTTP request, prefixed with User-agent: or User-Agent: and typically includes information such as the application name, version, host operating system, and language. The user agent string of the disclosed embodiments may be modified to include additional information, such as a content control token, or other identification data, in addition to an application name, an application version, a compatibility flag, a version token, and a platform token. The content control token may be used to identify the requesting device. Accordingly, as part of each communication made by a device, the user agent string is typically passed unmodified through a router which may be implementing NAT which would otherwise obscure the origin of the communication, as was described. As the user agent string is unmodified, the content control policy of the requesting device may then be retrieved based on the identification data, e.g. content control token, therein and compared with the rating of the requested domain.

Figure 10:
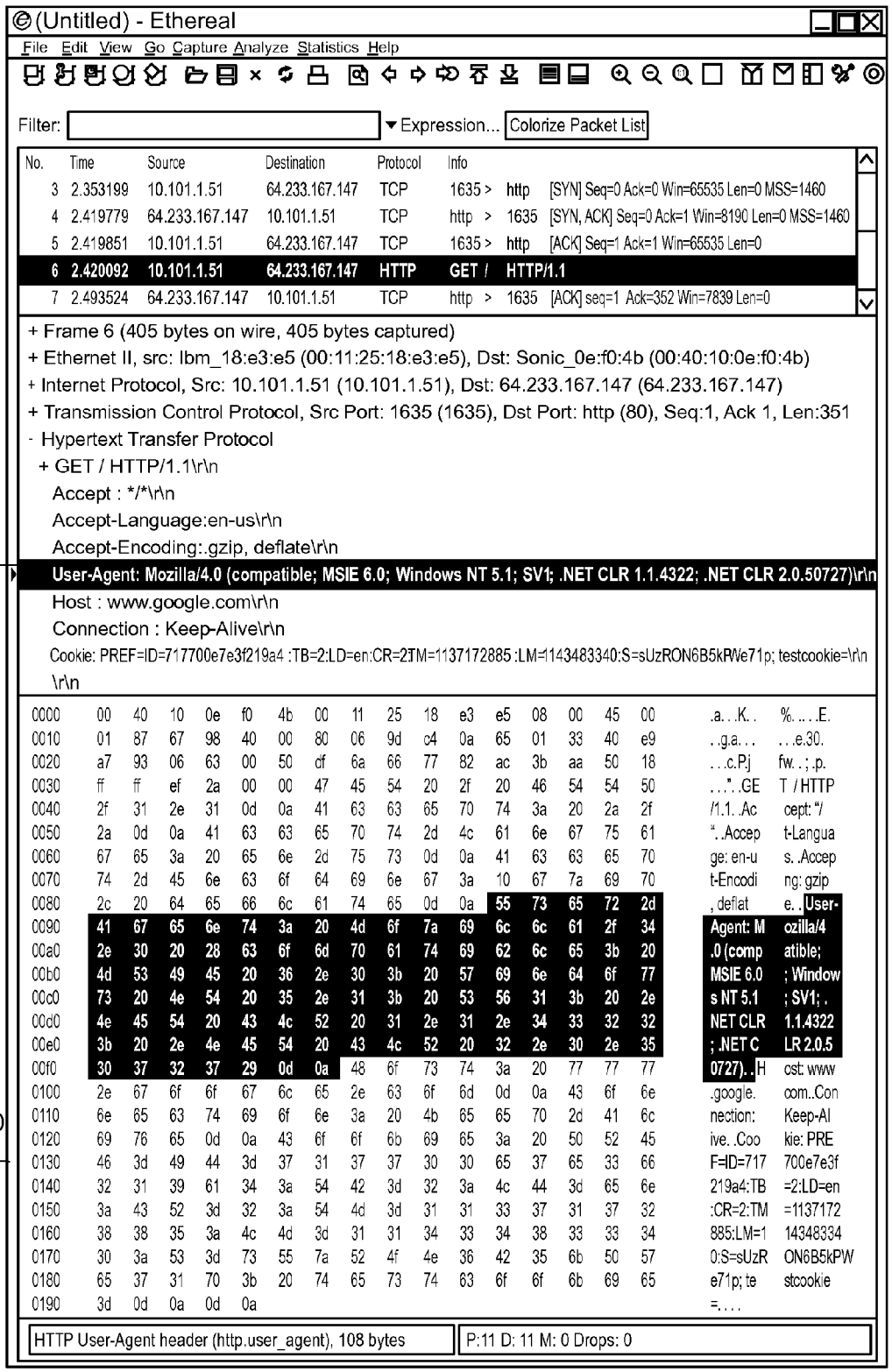
FIG. 10 is a screenshot of an application inspecting a packet containing a user agent string without a content control token in the systems of FIG. 1 and FIG. 2, or other systems for differentiating unique systems sharing a common address.

FIG. 10 is a screenshot of an application 1000 inspecting a packet containing a user agent string without a content control token in the systems of FIG. 1 and FIG. 2, or other systems for differentiating unique systems sharing a common address. The application 1000 may include a user agent string 1010 originating from a communication by a user A 120A for content hosted by the content provider A 110A. The user agent string 1010 may not include a content control token. If the account associated with the requesting device has enrolled in the content control service, and the user agent string 1010 does not include a content control token, the system 100 may redirect the user A 120A to the content control administration web site. The user A 120A may then be required to enroll the device in the content control service. The enrollment process may include adding the content control token "ParentalControlID" to the user agent string 1010 of the requesting device. Alternatively or in addition the content control service may implement the most restrictive content control policy until a specific content control policy is identified.

Figure 11:
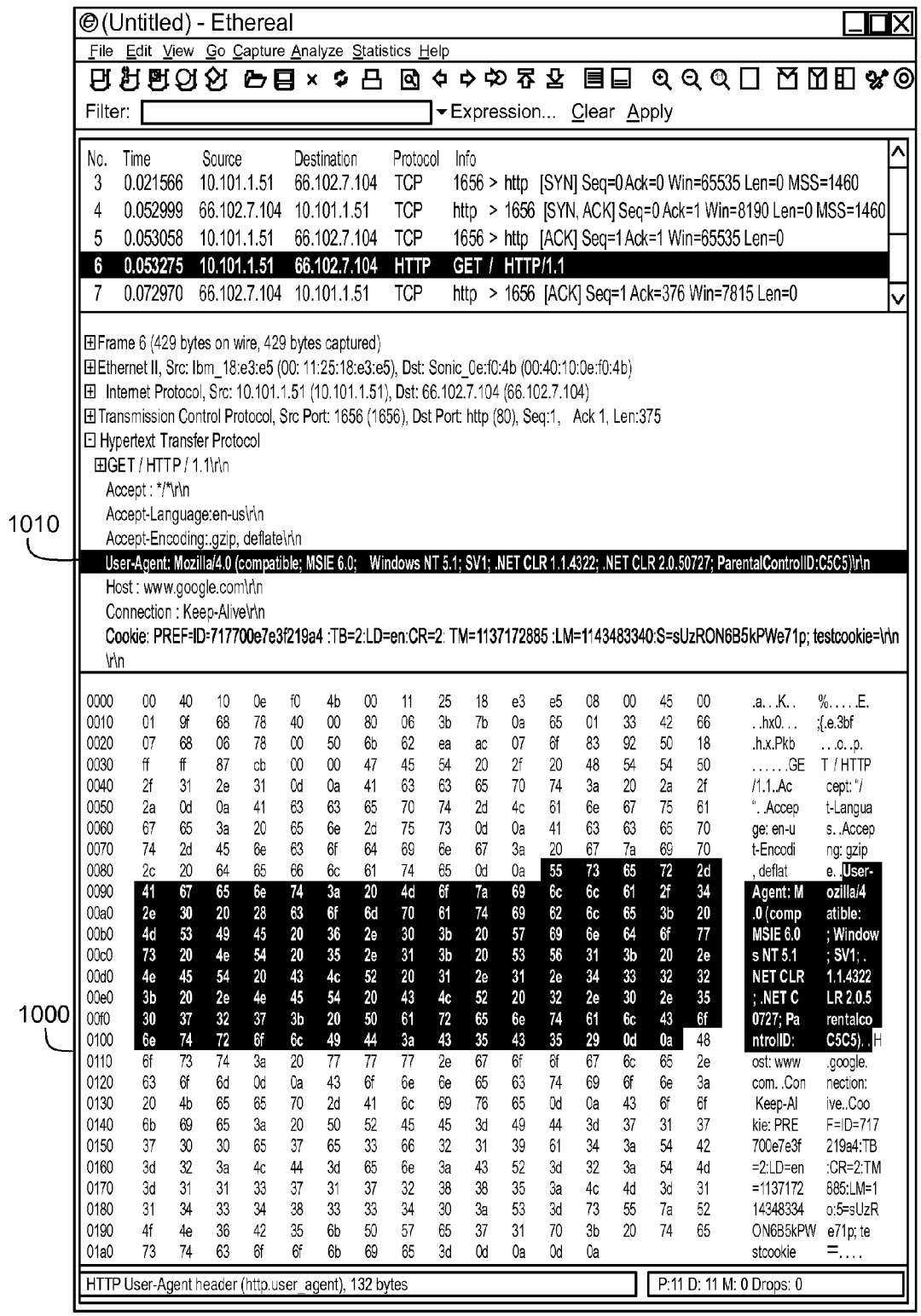
FIG. 11 is a screenshot of an application inspecting a packet containing a user agent string with a content control token in the systems of FIG. 1 and FIG. 2, or other systems for differentiating unique systems sharing a common address.

FIG. 11 is a screenshot of an application 1100 inspecting a packet containing a user agent string with a content control token in the systems of FIG. 1 and FIG. 2, or other systems for differentiating unique systems sharing a common address. The application 1100 may include a user agent string 1110. The user agent string 1110 may include a content control token, such as "ParentalControlID." The content control token may be used to identify communications originating from the requesting device. The content control token, "ParentalControlID," in the user agent string 1110 may have the value "C5C5." The content control token may be a part of every communication originating from the requesting device. The addition of the content control token to the user agent string 1110 may allow the system 100 to identify the requesting device without knowing the IP address, MAC address, or any details of the requesting device.

Figure 12:
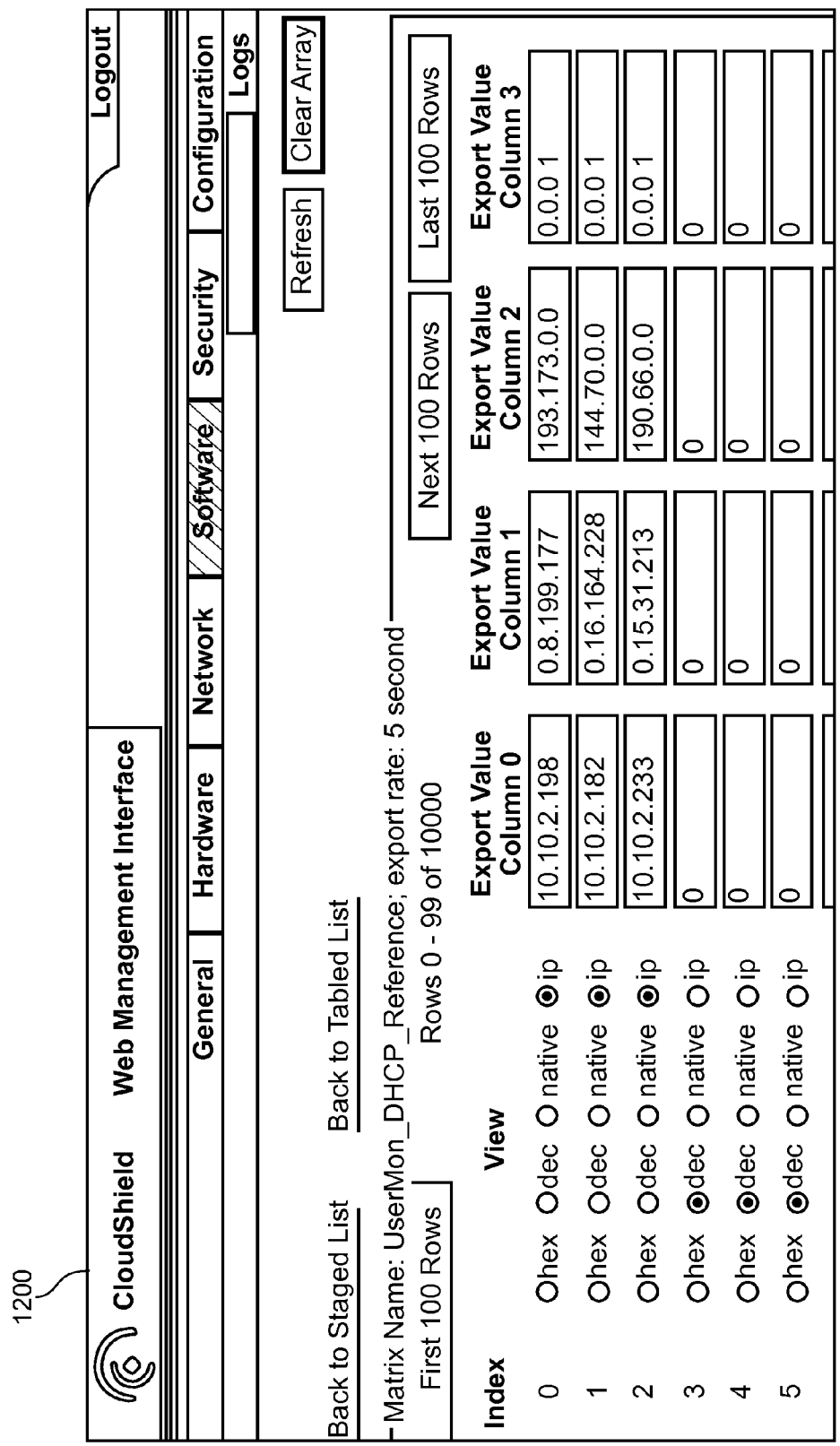
FIG. 12 is a screenshot of an interface for managing internet protocol ("IP") addresses assigned to devices in the systems of FIG. 1 and FIG. 2, or other systems for differentiating unique systems sharing a common address.

FIG. 12 is a screenshot of an interface 1200 for managing IP addresses assigned to devices in the systems of FIG. 1 and FIG. 2, or other systems for differentiating unique systems sharing a common address. The interface 1200 may display data relating to an association between an IP address and a MAC address of the user A 120A. The MAC address may represent the MAC address of a device of the user A 120A, or a router 225 of the user A 120A. The IP address may represent the IP address assigned to the account of the user A 120A. The system 100 may use the association in order to identify the content control policies associated with the account of the user A 120A. Alternatively or in addition, the IP address assigned to the user A 120A may be stored in the data store 245, at the time of leasing, by the service provider server 240.

The interface 1200 may display values associated with the association. Column0 may represent the IP address of the user A 120A, Column1 may represent the first 32 bits of the MAC address associated with the user A 120A, Column2 may represent the next 16 bits of the MAC address, and Column3 may represent the number of the times the IP address or MAC address changed. The interface 1200 may be used to monitor changes in the association between the MAC address and the IP address.

FIG. 13 is a screenshot of an interface 1300 for monitoring changes to the IP addresses of devices in the systems of FIG. 1 and FIG. 2, or other systems for differentiating unique systems sharing a common address. The interface 1300 may be used to monitor the networks 230, 235 for dynamic host protocol acknowledge ("DHCP ACK") packets. The DHCP ACK packets may identify a change in an IP address for a device. The interface 1400 may display the values of several variables, such as UserMon_DHCP_ACKResponse, which may represent the total number of messages which have been processed, UserMon_DHCP_LastIP, which may represent the last IP address allocated/renewed, and UserMon_DHCP_TotalRecords, which may represent the number of unique MAC addresses being tracked.

FIG. 14 illustrates a table 1400 showing exemplary categories for a content control service that may be provisioned to users in the systems of FIG. 1 and FIG. 2, or other systems for differentiating unique systems sharing a common address. The table 1400 may show some example categories for filtering content. The categories may be presented to the users 120A-N in order to assist the users 120A-N in developing content control policies. The rows of the table 1400 may contain the categories that web sites may be placed within. The columns of the table 1400 may represent pre-categorized options which may be presented to the users 120A-N. The users 120A-N may be able to select the categories individually or by columns. The system 100 may store the identified content control policy for each device of the users 120A-N.

FIG. 15 is an exemplary XML representation of the ratings of web sites in a content control service implemented by the systems of FIG. 1 and FIG. 2, or other systems for differentiating unique systems sharing a common address. A web site rating may be provisioned to the system 100 by providing the categories associated with the web site and the domain name of the web site. The domain name may be the key attribute that may be used to associate a communication for a web site with a content rating. The XML shown in FIG. 15 may be interpreted by an application using a standard XML parser. The data store 245 may store the rating entries for each domain. The entries in the data store 245 may be periodically deployed, or cached, to the service provisioning points 270 and the individual memories 320, such as policy data stores. By caching the entries directly to the service provisioning points 270, the system 100 may decrease the processing time needed for any given transaction.

When the system 100 deploys the entries to the service provisioning points 270, the entries may be adapted in a number of ways. First, based upon usage frequency, ratings corresponding to the most frequently accessed web sites may be cached. Alternatively or in addition, regional or governmental deployments may require modifying the ratings depending upon the particular region the ratings are being deployed to. For example, international deployments may have governmental requirements, and certain sites not objectionable in one region may be objectionable in another region.

Alternatively or in addition, the format of the entries may change as the data is deployed to the service provisioning points 270. For example, the domain names may be turned into a 32-bit hash of the name. The hash values may be reduced to the appropriate index value. For example, twenty bits may represent one million possible domains, and twenty-one or twenty-two bits may be used for one million domains with reduced collisions for faster comparison. The original 32-bit has value may be presented to verify intersect. The ratings may be stored in bit fields for rapid comparison. For example, high order bit of byte one could be Search Engines/Portals. Each site may have as many ratings as desired. A cross-check value may be identified such as four bytes of unique name plus it's offset in the domain. For example "goog" at the first four bytes for "google"© may be a good domain cross check to make sure the hash based comparison found the correct site.

Using the above example, "google.com" may generate a 32-bit hash value of "0xC45B128E" when run through the algorithm. This same value may be generated in real-time from the host field in an HTTP GET or POST, as well as by the resource controllers 426. Using a twenty bit index, the upper twelve bits may be removed, creating an index value of 0x000B128E. In a use case of this approach (without collision management), at row 725, 636 (0xB128E), the following data may be written: "0xC45B128E", "10", "0x676F6F67", "b100000000 00000000 00000000 00000000".

In this instance, the first column may contain the 32-bit hash to ensure that at 32-bits of hash the domain is the one observed. The second column may represent the number of characters from the end of the domain name used to find a unique segment of the domain name. In the above example, the "goog" portion of "google.com" may be selected where the lowercase 'g' may be represented by 67 in hexadecimal and 'o' may be represented by 6F in hexadecimal. The first three columns may be focused on high speed comparisons and on the assurance of the match of domains where millions of domains are stored and compared. The comparisons may not require state machine based expression or string matching engines which may not have as tight of memory consumption to fit in data plane systems at the aforementioned magnitude. The remaining values may represent the categories associated with the domain. Each category may be assigned a bit position within 32-bit values. For up to thirty-two categories this may be represented in a single column and each additional thirty-two categories may represent adding one more column. The comparison may be done by a logical AND of the customer's preference with the selected domain and finding any comparisons that are non-zero resulting values.

Alternately or in addition objectionable domains accessed via an IP address may be filtered based upon IP addresses. Domains may be identified by the destination IP address or the IP address specified in the Host entry within the HTTP request. The destination IP addresses may be compared using IP address lists in a lookup table similar to access control list ("ACL") filtering. IP addresses in the Host field may be processed similar to domain names described above similar to if the text representation of an IP address was a domain name. Alternatively or in addition the text IP address in the Host field may be converted to a 32-bit representation and processed similar to destination IP addresses. In an implementation controlling content of VoIP and IPTV, the SIP based IP addresses may be similarly processed. In the case of IPTV the system 100 may store ratings for each show currently available, or may store ratings specific to each channel.

Figure 16:
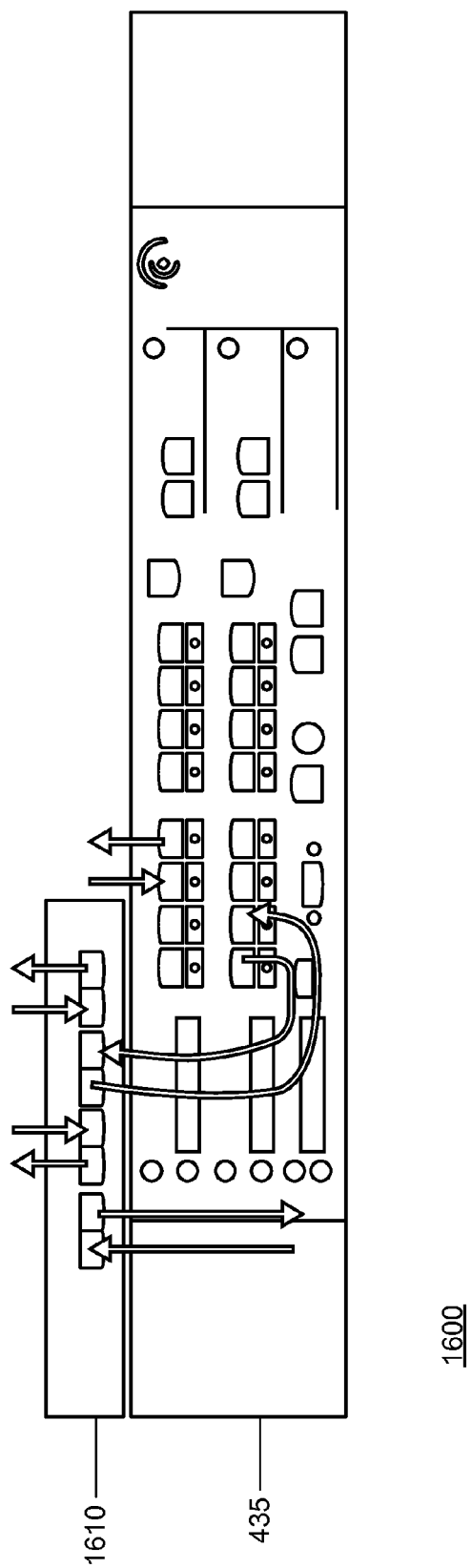
FIG. 16 is an illustration of a network configuration implementing the systems of FIG. 1 and FIG. 2, or other systems for differentiating unique systems sharing a common address.

FIG. 16 illustrates a network configuration 1600 implementing the systems of FIG. 1 and FIG. 2, or other systems for differentiating unique systems sharing a common address. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network configuration 1600 may include a service provisioning point 270 and an optical bypass module 1610, such as the tap 265. The service provisioning point 270 may include one or more deep packet processing modules which may be tied into the optical bypass module 1610. The optical bypass module 1610 may provide an interface to the traffic communicated through the service provider gateway 260. The optical bypass module 1610 may monitor the activity on the networks 230, 235, and determine if it continues to maintain link and process appropriately. If a failure should happen, a secondary device within the same or a separate system may be replaced in the networks 230, 235 by the bypass or the capability may be bypassed as a whole. Active inline systems may be deployed logically inline, often attached to switches with layer 2 insertion between routers.

FIG. 17 illustrates a general computer system 1700, which may represent a service provider server 240, a service provisioning point 270, the content provider servers 210A-N, the web applications, standalone applications, mobile applications 220A-N, or any of the other computing devices referenced herein. The computer system 1700 may include a set of instructions 1724 that may be executed to cause the computer system 1700 to perform any one or more of the methods or computer based functions disclosed herein. The computer system 1700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1724 (sequential or otherwise) that specify actions to be taken by that machine. In a particular embodiment, the computer system 1700 may be implemented using electronic devices that provide voice, video or data communication. Further, while a single computer system 1700 may be illustrated, the term "system" shall also be taken to include any collection of systems or subsystems that individually or jointly execute a set, or multiple sets, of instructions to perform one or more computer functions.

As illustrated in FIG. 17, the computer system 1700 may include a processor 1702, such as, a central processing unit (CPU), a graphics processing unit (GPU), or both. The processor 1702 may be a component in a variety of systems. For example, the processor 1702 may be part of a standard personal computer or a workstation. The processor 1702 may be one or more general processors, digital signal processors, application specific integrated circuits, field programmable gate arrays, servers, networks, digital circuits, analog circuits, combinations thereof, or other now known or later developed devices for analyzing and processing data. The processor 1702 may implement a software program, such as code generated manually (i.e., programmed).

The computer system 1700 may include a memory 1704 that can communicate via a bus 1708. The memory 1704 may be a main memory, a static memory, or a dynamic memory. The memory 1704 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1704 may include a cache or random access memory for the processor 1702. Alternatively or in addition, the memory 1704 may be separate from the processor 1702, such as a cache memory of a processor, the system memory, or other memory. The memory 1704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1704 may be operable to store instructions 1724 executable by the processor 1702. The functions, acts or tasks illustrated in the figures or described herein may be performed by the programmed processor 1702 executing the instructions 1724 stored in the memory 1704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 1700 may further include a display 1714, such as a liquid crystal display (LCD), an organic light emitting diode (OLED), a flat panel display, a solid state display, a cathode ray tube (CRT), a projector, a printer or other now known or later developed display device for outputting determined information. The display 1714 may act as an interface for the user to see the functioning of the processor 1702, or specifically as an interface with the software stored in the memory 1704 or in the drive unit 1706.

Additionally, the computer system 1700 may include an input device 1712 configured to allow a user to interact with any of the components of system 1700. The input device 1712 may be a number pad, a keyboard, or a cursor control device, such as a mouse, or a joystick, touch screen display, remote control or any other device operative to interact with the system 1700.

The computer system 1700 may also include a disk or optical drive unit 1706. The disk drive unit 1706 may include a computer-readable medium 1722 in which one or more sets of instructions 1724, e.g. software, can be embedded. Further, the instructions 1724 may perform one or more of the methods or logic as described herein. The instructions 1724 may reside completely, or at least partially, within the memory 1704 and/or within the processor 1702 during execution by the computer system 1700. The memory 1704 and the processor 1702 also may include computer-readable media as discussed above.

The present disclosure contemplates a computer-readable medium 1722 that includes instructions 1724 or receives and executes instructions 1724 responsive to a propagated signal; so that a device connected to a network 235 may communicate voice, video, audio, images or any other data over the network 235. Further, the instructions 1724 may be transmitted or received over the network 235 via a communication interface 1718. The communication interface 1718 may be a part of the processor 1702 or may be a separate component. The communication interface 1718 may be created in software or may be a physical connection in hardware. The communication interface 1718 may be configured to connect with a network 235, external media, the display 1714, or any other components in system 1700, or combinations thereof. The connection with the network 235 may be a physical connection, such as a wired Ethernet connection or may be established wirelessly as discussed below. Likewise, the additional connections with other components of the system 1700 may be physical connections or may be established wirelessly. In the case of a service provider server 240 or the content provider servers 110A-N, the servers may communicate with users 120A-N through the communication interface 1718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 1722 may be a single medium, or the computer-readable medium 1722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1722 may include a solid-state memory such as a memory card or other package that houses one or more non-volatile read-only memories. The computer-readable medium 1722 also may be a random access memory or other volatile re-writable memory. Additionally, the computer-readable medium 1722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description, such as providing for a secure login to a third party server, tracking the behavior of users on a network, or generally any embodiment of identifying unique systems sharing a common address.

A service provider, such as a bank, credit card company, or other provider of services, may use the system to provide a secure login to their servers by identifying each user based on the particular device of the user, or a particular login of a shared device. The service provider may add data representing a unique identifier to the user's device, such as by adding a token to the user agent string. If the user attempts to access the services of the service provider from a device which does not contain the identifier in the user agent string, the user may be denied services, or the user may be asked a secondary security question, such as their mother's maiden name. The system may provide an extra layer of security by ensuring the user is accessing the services from their own device and/or login.

Alternatively or in addition a service provider may use the system to track the behavior of individual users on a network. Each user may be individually identifiable and the behavior of each user on the internet may be individually tracked. The user's behavior may be used by the service provider to provide advertisements specific to the behavior of the user. The service provider may be able to add advertisements to any packets transmitted to the user.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method of provisioning services to each device of a plurality of devices sharing a common address, the method comprising:
receiving a designation of each device of the plurality of devices, a designation of each user of a plurality of users of a device of the plurality of devices, and a specification of a corresponding device specific service to be provisioned for each designated user;
causing each of the plurality of devices to provide a unique identifier with each communication originated by the device, the unique identifier uniquely identifying each device from at least the other devices of the plurality of devices independent of the common address and further identifying which of the plurality of users is using the device, wherein the unique identifier is associated with the device specific service to be provisioned;
intercepting a communication having the common address from an originating device of the plurality of devices and determining the unique identifier provided with the communication, the communication otherwise not uniquely identifying the originating device from others of the plurality of devices;
determining the associated device specific service to be provisioned based on at least the unique identifier; and
processing the communication in accordance with the associated device specific service to be provisioned.

2. The method of claim 1 further comprising blocking communications from a device sharing the common address where the communication is provided without a unique identifier.

3. The method of claim 1 further comprising expiring the unique identifier upon the elapse of a period of time.

4. The method of claim 1 wherein a transport layer and a network layer of the plurality of devices are non-unique and each device is identified at an application layer of each device.

5. The method of claim 1 wherein the determining further comprises determining the device specific service to be provisioned based on the unique identifier and the common address.

6. The method of claim 1, wherein the communication comprises a destination, the processing comprises allowing the communication to continue to the destination, and
wherein the method further comprises intercepting a response sent by the destination to the originating device based on the communication and processing the response in accordance with the associated device specific service to be provisioned.

7. A system for provisioning services to each device of a plurality of devices sharing a common address, the system comprising:
means for receiving a designation of each device of the plurality of devices, a designation of each user of a plurality of users of a device of the plurality of devices, and a specification of a corresponding device specific service to be provisioned for each designated user;
means for causing each of the plurality of devices to provide a unique identifier with each communication originated by the device, the unique identifier uniquely identifying each device from at least the other devices of the plurality of devices independent of the common address and further identifying which of the plurality of users is using the device, wherein the unique identifier is associated with the device specific service to be provisioned;
means for intercepting a communication having the common address from an originating device of the plurality of devices and determining the unique identifier provided with the communication, the communication otherwise not uniquely identifying the originating device from others of the plurality of devices;
means for determining the associated device specific service to be provisioned based on at least the unique identifier; and
means for handling the communication in accordance with the associated device specific service to be provisioned.

8. The system of claim 7 further comprising a means for blocking communications from a device sharing the common address where the communication is provided without a unique identifier.

9. The system of claim 7 further comprising a means for expiring the unique identifier upon the elapse of a period of time.

10. The system of claim 7 wherein the means for determining further comprises means for determining the device specific service to be provisioned based on the unique identifier and the common address.

11. The system of claim 7, wherein the communication comprises a destination, the means for handling comprising means for allowing the communication to continue to the destination, and
wherein the system further comprises a means for intercepting a response sent by the destination to the originating device based on the communication and a means for handling the response in accordance with the associated device specific service to be provisioned.

12. A system for provisioning a device specific service for each device of a plurality of devices sharing a common address, the system comprising:
an interface operative to receive a designation of each device of the plurality of devices, a designation of each user of a plurality of users of a device of the plurality of devices, and a specification of a corresponding device specific service to be provisioned for each designated user;
a device identifier coupled with the interface and operative to cause each of the plurality of devices to provide a unique identifier with each communication originated by the device, the unique identifier uniquely identifying each device from at least the other devices of the plurality of devices independent of the common address and further identifying which of the plurality of users is using the device, the device identifier being further operative to store the unique identifier and the specification of the associated device specific service to be provisioned in a memory;
a communication interceptor operative to intercept a communication having the common address from an originating device of the plurality of devices and determine the unique identifier provided therewith, the communication otherwise not uniquely identifying the originating device from others of the plurality of devices; and
a communication processor coupled with the memory and the communication interceptor and operative to determine the associated device specific service to be provisioned based on at least the unique identifier and process the communication in accordance with the associated device specific service to be provisioned.

13. The system of claim 12 wherein the communication processor is further operative to block communications from a device sharing the common address where the communication does not contain a unique identifier.

14. The system of claim 12 wherein the unique identifier is further operative to expire the unique identifier upon the elapse of a period of time.

15. The system of claim 12 wherein the communication processor is further operative to determine the device specific service to be provisioned based on the unique identifier and the common address.

16. A method for provisioning services to users, the method comprising:
receiving a designation of a device, a designation of a user of the device, and a specification of a corresponding device specific service to be provisioned for the designated user, wherein the specification specifies a service that should be provided to the designated device when being used by the designated user;
modifying a communication generated by the designated device to enable identification of the designated device and a user of the designated device via the communication;
intercepting a communication associated with a service from a device;
processing the communication to identify the communicating device and the user thereof;
determining whether the service comprises the device specific service to be provisioned and whether the device is the designated device and the user of the device is the designated user; and
allowing the service to be provisioned to the device if the service comprises the device specific service to be provisioned, the device is the designated device and the user of the device is the designated user, otherwise preventing the service from being provisioned to the device.

17. The method of claim 16 further comprising modifying the communication generated by the device to prevent identification of the device via the communication.

18. The method of claim 16 wherein the communication comprises an HTTP request.

19. The method of claim 16 wherein the modifying further comprises modifying a user agent string on the device.

20. The method of claim 16 wherein determining further comprises:
performing deep packet inspection on the communication to determine the service; and
determining whether the service comprises the service specified by the specification.

21. The method of claim 16 wherein modifying the communication generated by the device to enable identification of the device via the communication further comprises modifying the device to enable identification thereof via the communication generated by the device.

22. A method of controlling content provided to each user in a plurality of users on a network, the method comprising:
receiving a designation of each device of a plurality of devices sharing a common address on a network and a specification of a corresponding device specific content control policy, wherein the content control policy describes, for each device in the plurality of devices, a content that should be prevented from being provided to the device;
modifying data on each device so that each device may be identified is identifiable through processing a communication from the device independent of the common address;
providing a monitoring device, wherein the monitoring device monitors a plurality of communications from the plurality of devices on the network;
storing, in a data store, a content rating for each domain in a plurality of domains, wherein the content rating describes a content provided by each domain;
identifying, via the monitoring device, a communication for an item wherein the communication has the common address;
processing the communication to identify the designation associated with a device in the plurality of devices the communication originated from, the communication otherwise unable to uniquely identify the originating device from the others of the plurality of devices;
retrieving the content control policy of the device;
processing the communication to identify the domain providing the item;
retrieving a content rating of the identified domain from the data store;

determining whether the content rating of the domain describes a content described by the content control policy of the device; and preventing the item from being provided to the device if the content rating of the domain describes the content described by the content control policy of the device, otherwise allowing the item to be provided to the device.

23. The method of claim 22 wherein the content control policy describes, for each device in the plurality of devices, the content that should be allowed to be provided to the device.

24. The method of claim 22 wherein preventing the item from being provided to the device further comprises preventing the item from being provided to the device if the content rating of the domain does not describe the content described by the content control policy of the device, otherwise allowing the item to be provided to the device.

25. The method of claim 22 wherein the data modified on each device in the plurality of devices comprises a user agent string on the device.

26. The method of claim 25 wherein modifying the data on the device further comprises adding a token to the user agent string on the device.

* * * * *